United States Patent
Bolane et al.

(10) Patent No.: US 9,114,291 B2
(45) Date of Patent: Aug. 25, 2015

(54) INTERCHANGEABLE SHAFT AND CLUB HEAD CONNECTION SYSTEM

(71) Applicants: Jesse Bolane, San Marcos, CA (US); Joshua G. Breier, Vista, CA (US); Karl A. Clausen, Carlsbad, CA (US); Andrew Curtis, Solana Beach, CA (US); Steven M. Mitzel, Carlsbad, CA (US); Scott H. Moreira, San Diego, CA (US)

(72) Inventors: Jesse Bolane, San Marcos, CA (US); Joshua G. Breier, Vista, CA (US); Karl A. Clausen, Carlsbad, CA (US); Andrew Curtis, Solana Beach, CA (US); Steven M. Mitzel, Carlsbad, CA (US); Scott H. Moreira, San Diego, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 56 days.

(21) Appl. No.: 13/793,711

(22) Filed: Mar. 11, 2013

(65) Prior Publication Data
US 2013/0244805 A1 Sep. 19, 2013

Related U.S. Application Data

(63) Continuation-in-part of application No. 12/760,923, filed on Apr. 15, 2010, now abandoned, which is a continuation-in-part of application No. 11/958,412, filed on Dec. 18, 2007, now Pat. No. 7,878,921, which is a continuation-in-part of application No. 11/734,819, filed on Apr. 13, 2007, now abandoned.

(51) Int. Cl.
*A63B 53/02* (2006.01)
*F16B 41/00* (2006.01)
*F16B 35/04* (2006.01)
*A63B 59/00* (2015.01)
*A63B 53/04* (2015.01)

(52) U.S. Cl.
CPC ............... *A63B 53/02* (2013.01); *A63B 53/047* (2013.01); *A63B 53/0466* (2013.01); *F16B 35/041* (2013.01); *F16B 41/002* (2013.01); *A63B 53/0487* (2013.01); *A63B 59/0092* (2013.01); *A63B 2053/023* (2013.01); *A63B 2053/0491* (2013.01)

(58) Field of Classification Search
CPC .. A63B 53/0466; A63B 53/047; A63B 53/02; A63B 59/0092; A63B 2053/023; A63B 2053/0491; A63B 53/0487; F16B 35/041; F16B 41/002
See application file for complete search history.

(56) References Cited

U.S. PATENT DOCUMENTS

| | | | |
|---|---|---|---|
| 796,802 | A | 8/1905 | Brown |
| 1,540,559 | A | 6/1925 | Murphy |
| 1,623,523 | A | 4/1927 | Bourke |
| 1,634,082 | A | 6/1927 | Rigby |
| 1,946,134 | A | 2/1934 | Dyce |
| 3,424,459 | A | 1/1969 | Evancho |
| 3,516,697 | A | 6/1970 | Hahn |
| 3,524,646 | A | 8/1970 | Wheeler |
| 4,597,577 | A | 7/1986 | Lamanna |
| 4,611,418 | A | 9/1986 | Launder |
| 4,852,782 | A | 8/1989 | Wu et al. |

(Continued)

*Primary Examiner* — Stephen Blau
(74) *Attorney, Agent, or Firm* — Brown Rudnick LLP

(57) ABSTRACT

A releasable connection system for assembling a shaft and a club head, e.g., a golf club shaft and a golf club head. The connection system provides interchangeability between a shaft and a club head and allows the head to be adjusted with respect to the shaft. The mating structures between the shaft and the club head may be indexed for reproducible placement. In an embodiment, the connection system also includes retaining structures that maintain the connection fastener position when the head and shaft are separated.

19 Claims, 34 Drawing Sheets

(56) References Cited

U.S. PATENT DOCUMENTS

| | | | |
|---|---|---|---|
| 4,943,059 A | 7/1990 | Morell | |
| 5,039,098 A | 8/1991 | Pelz | |
| 5,199,152 A * | 4/1993 | Wagner | 29/444 |
| 5,244,325 A * | 9/1993 | Knohl | 411/353 |
| 5,275,399 A | 1/1994 | Schmidt et al. | |
| 5,275,409 A | 1/1994 | Currie | |
| 5,388,827 A | 2/1995 | Reynolds, Jr. | |
| 5,433,442 A | 7/1995 | Walker | |
| 5,496,029 A | 3/1996 | Heath et al. | |
| 5,513,844 A | 5/1996 | Ashcraft et al. | |
| 5,588,921 A | 12/1996 | Parsick | |
| 5,722,901 A | 3/1998 | Barron et al. | |
| 5,863,260 A | 1/1999 | Butler, Jr. et al. | |
| 5,951,411 A | 9/1999 | Wood et al. | |
| 6,059,503 A * | 5/2000 | Johnson | 411/353 |
| 6,149,533 A | 11/2000 | Finn | |
| 6,168,534 B1 | 1/2001 | Schultz | |
| 6,267,421 B1 * | 7/2001 | Burton | 292/340 |
| 6,280,132 B1 * | 8/2001 | Szczukowski et al. | 411/353 |
| 6,475,100 B1 | 11/2002 | Helmstetter et al. | |
| 6,514,154 B1 | 2/2003 | Finn | |
| 6,547,673 B2 | 4/2003 | Roark | |
| 6,746,341 B1 | 6/2004 | Hamric, Jr. et al. | |
| 6,769,996 B2 | 8/2004 | Tseng | |
| 6,786,834 B1 | 9/2004 | Matheson et al. | |
| 6,890,269 B2 | 5/2005 | Burrows | |
| 7,014,569 B1 | 3/2006 | Figgers | |
| 7,083,529 B2 | 8/2006 | Cackett et al. | |
| 7,115,046 B1 | 10/2006 | Evans | |
| 7,207,897 B2 | 4/2007 | Burch et al. | |
| 7,238,119 B2 | 7/2007 | Roach et al. | |
| 7,326,126 B2 * | 2/2008 | Holt et al. | 473/307 |
| 7,887,431 B2 * | 2/2011 | Beach et al. | 473/307 |
| 8,535,173 B2 * | 9/2013 | Golden et al. | 473/307 |
| 8,794,889 B2 * | 8/2014 | Aukzemas et al. | 411/353 |
| 2001/0007835 A1 | 7/2001 | Baron | |
| 2002/0150443 A1 * | 10/2002 | Johnson et al. | 411/353 |
| 2003/0148818 A1 | 8/2003 | Myrhum et al. | |
| 2003/0194293 A1 * | 10/2003 | Johnson et al. | 411/353 |
| 2004/0018887 A1 | 1/2004 | Burrows | |
| 2005/0049072 A1 | 3/2005 | Burrows | |
| 2005/0129461 A1 * | 6/2005 | Bruno | 403/408.1 |
| 2005/0176521 A1 | 8/2005 | Burch et al. | |
| 2006/0015066 A1 | 1/2006 | Turieo et al. | |
| 2006/0105855 A1 | 5/2006 | Cackett et al. | |
| 2006/0281575 A1 | 12/2006 | Hocknell et al. | |
| 2006/0287125 A1 | 12/2006 | Hocknell et al. | |
| 2006/0293115 A1 | 12/2006 | Hocknell et al. | |
| 2006/0293116 A1 | 12/2006 | Hocknell et al. | |
| 2007/0155529 A1 | 7/2007 | Voges | |
| 2008/0058120 A1 | 3/2008 | Roberts et al. | |
| 2012/0165110 A1 * | 6/2012 | Cheng | 473/305 |
| 2014/0321942 A1 * | 10/2014 | Aukzemas et al. | 411/353 |

* cited by examiner

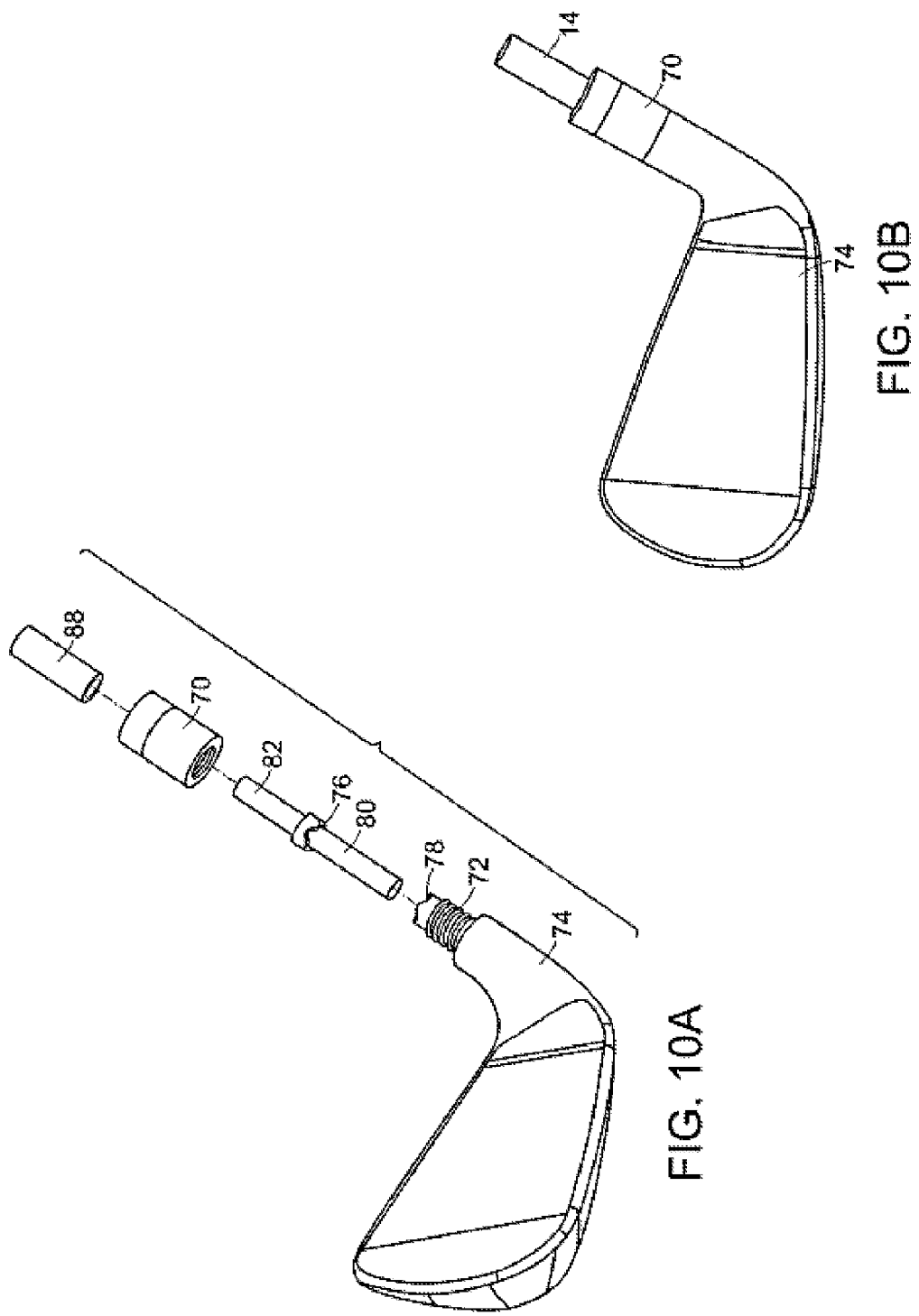

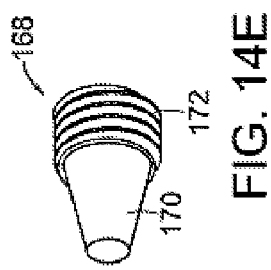
FIG. 14E
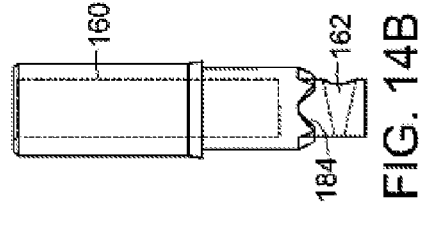
FIG. 14B
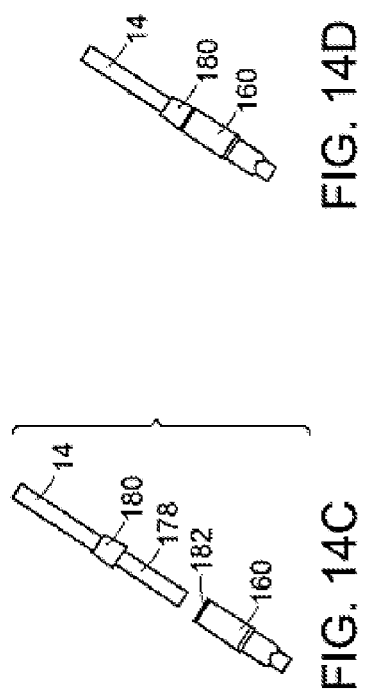
FIG. 14D
FIG. 14C
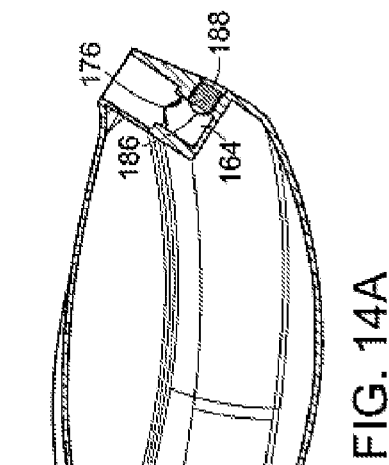
FIG. 14A
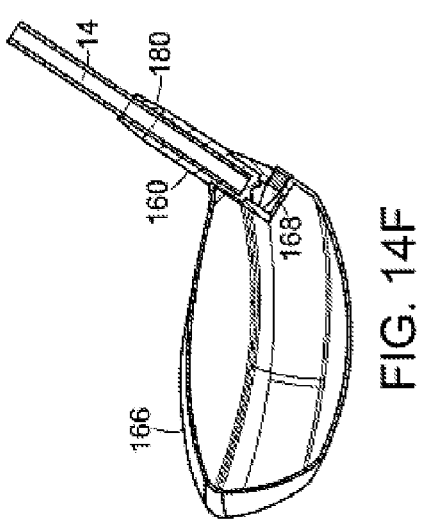
FIG. 14F

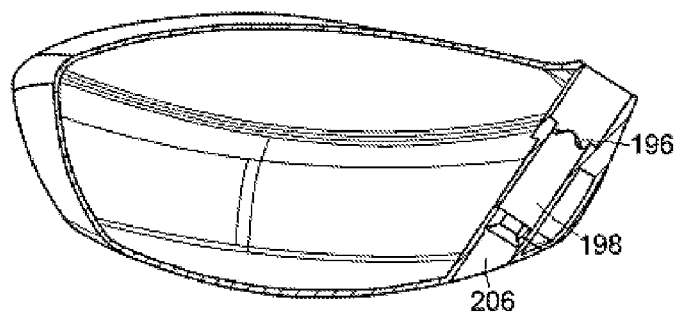
FIG. 15A
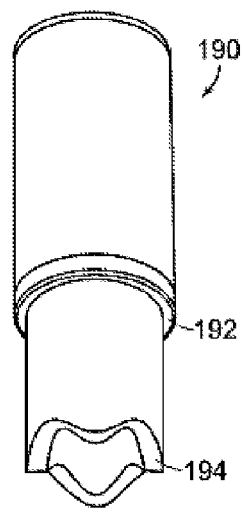
FIG. 15B
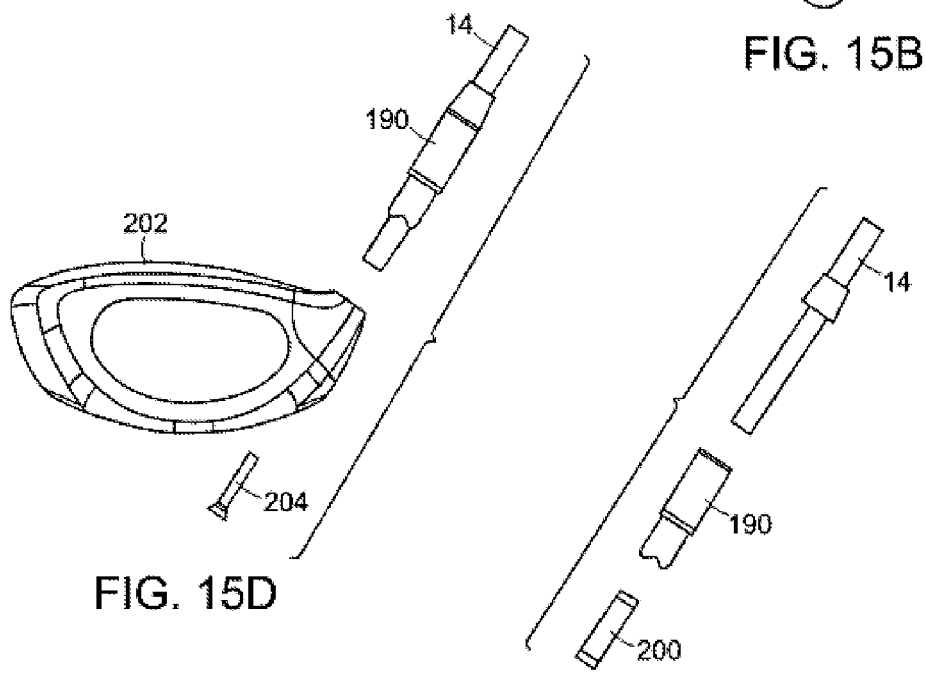
FIG. 15D
FIG. 15C

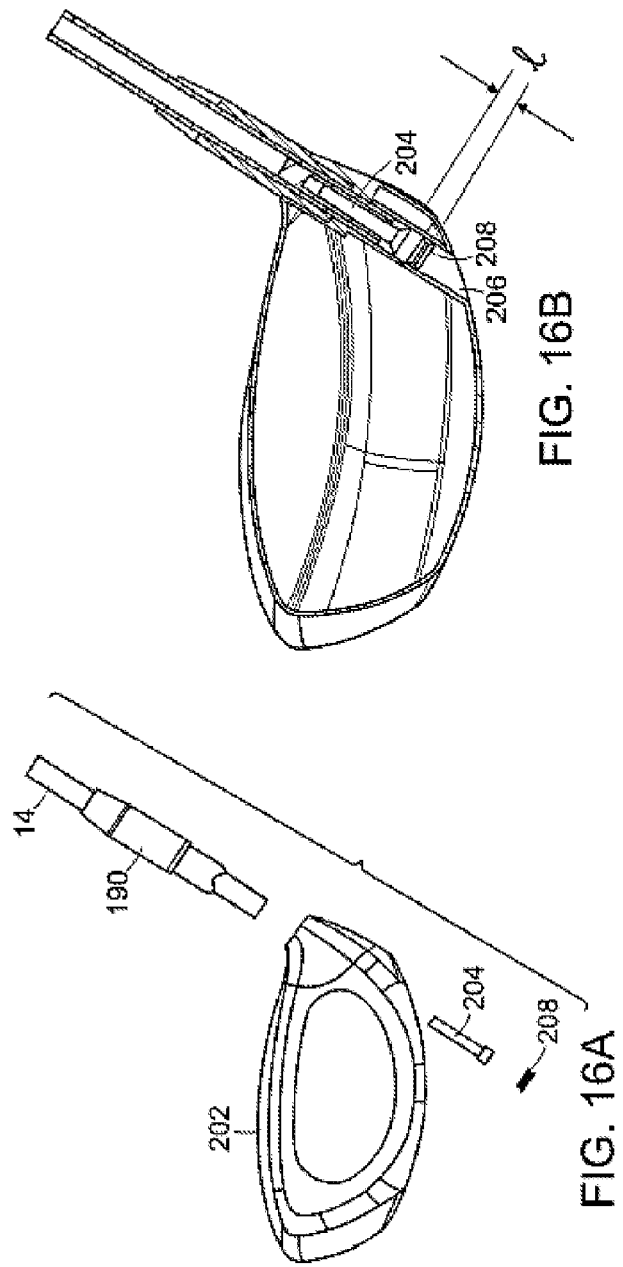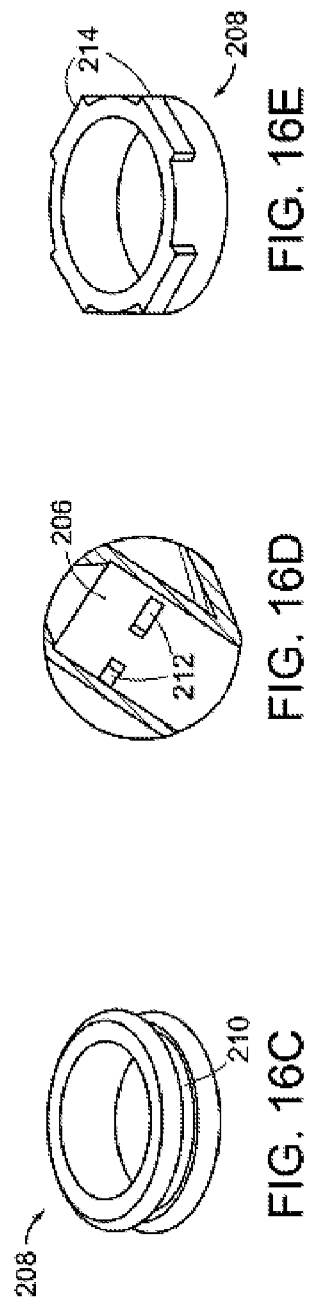

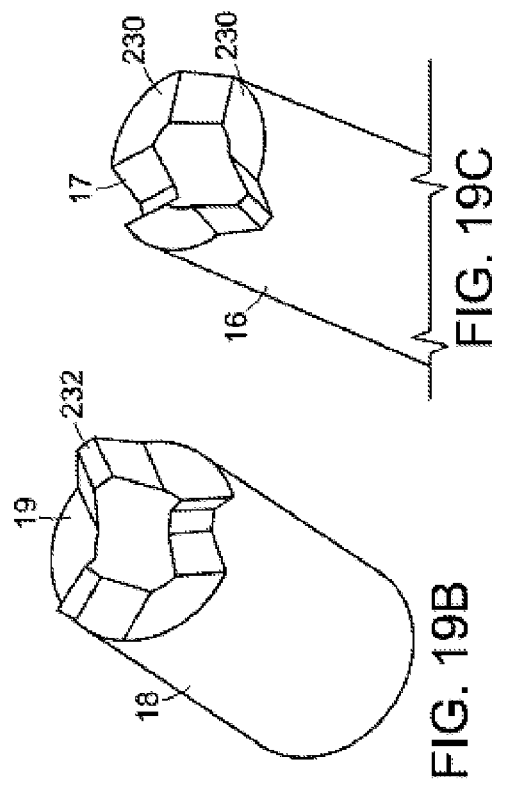
FIG. 19B
FIG. 19C
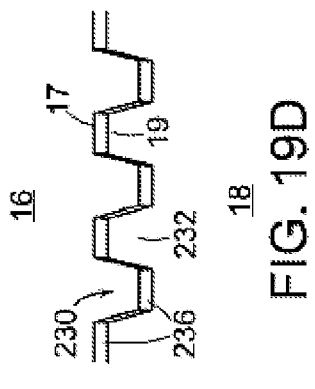
FIG. 19D
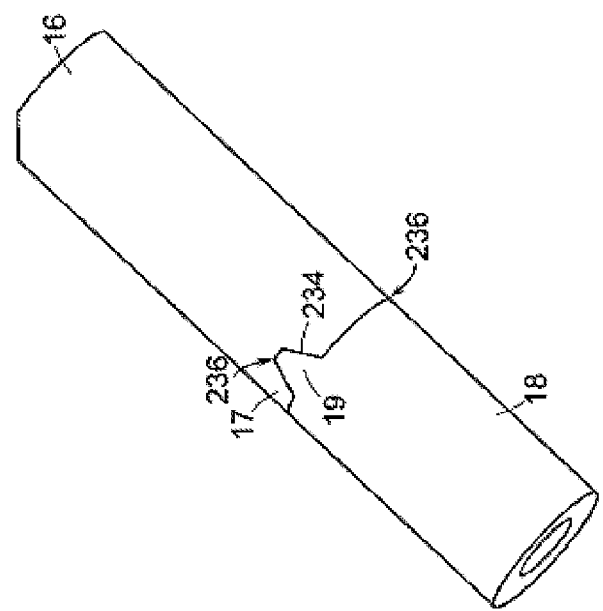
FIG. 19A

INTERCHANGEABLE SHAFT AND CLUB HEAD CONNECTION SYSTEM

CROSS REFERENCE TO RELATED APPLICATIONS

This application is a continuation-in-part of U.S. patent application Ser. No. 12/760,923, filed Apr. 15, 2010, which is a continuation-in-part of U.S. patent application Ser. No. 11/958,412, filed Dec. 18, 2007, now U.S. Pat. No. 7,878,921, which is a continuation-in-part of U.S. patent application Ser. No. 11/734,819, filed Apr. 13, 2007, abandoned. Each of the listed applications are incorporated herein by reference in their entirety.

FIELD OF THE INVENTION

This invention generally relates to golf clubs, and more specifically to golf clubs having an improved hosel connection that provides interchangeability and adjustability between a shaft and a club head.

BACKGROUND OF THE INVENTION

In order to improve their game, golfers often customize their equipment to fit their particular swing. In the absence of a convenient way to make shafts and club heads interchangeable, a store or a business offering custom fitting must either have a large number of clubs with specific characteristics, or must change a particular club using a complicated disassembly and reassembly process. If, for example, a golfer wants to try a golf club shaft with different flex characteristics, or use a club head with a different mass, center of gravity, or moment of inertia, in the past it has not been practical to make such changes. Golf equipment manufacturers have been increasing the variety of clubs available to golfers. For example, a particular model of golf club may be offered in several different loft angles and lie angles to suit a particular golfer's needs. In addition, golfers can choose shafts, whether metal or graphite, and adjust the length of the shaft to suit their swing. Recently, golf clubs have emerged that allow shaft and club head components, such as adjustable weights, to be interchanged to facilitate this customization process.

Golfers may also wish to adjust the loft angle, lie angle, or other trajectory setting of a club, for example to change the anticipated trajectory of a ball, as needed, in response to the topography of the course or the weather. For example, a golfer teeing off on a long dogleg may benefit from hitting a fade in order to land the ball in the center of the fairway. Alternatively, a golfer whose swing is reliably errant, e.g., due to an injury, may want to adjust the loft angle of the club in order to "straighten out" his or her swing. Such features are available in commercially-available clubs, such as clubs using MYFLY™ adjustable flight technology from Cobra Puma Golf (Carlsbad, Calif.).

While the mechanics of adjustable and detachable heads are often similar, it is important that an adjustable head is reversibly engageable to the shaft so that the club head can be repeatedly adjusted without damaging the fastening mechanism. Furthermore, it is beneficial if the fastening mechanism is easy to operate (e.g., using a PGA-approved tool) and "dummy-proof", i.e., it is difficult to lose the fastener or misalign the shaft when re-engaging. Additionally, a reversible fastening mechanism design should minimize the weight in the club head. If weight must be added, the weight preferably should be added toward the sole and back of the club head thereby allowing the center of mass to stay low in the club head.

Examples of detachable/replaceable golf club heads include U.S. Pat. No. 3,524,646 to Wheeler for a Golf Club Assembly. The Wheeler patent discloses a putter having a grip and a putter head, both of which are detachable from a shaft. Fastening members, provided on the upper and lower ends of the shaft, have internal threads, which engage the external threads provided on both the lower end of the grip and the upper end of the putter head shank to secure these components to the shaft. The lower portion of the shaft further includes a flange, which contacts the upper end of the putter head shank, when the putter head is coupled to the shaft. This design produces an unaesthetic bulge at the top of the shaft and another unaesthetic bulge at the bottom of the shaft.

Another example is U.S. Pat. No. 4,943,059 to Morell for a Golf Club Having Removable Head. The Morell patent discloses a putter golf club including a releasable golf club head and an elongated golf club shaft. The club head hosel has a plug containing a threaded axial bore. A threaded rod is retained on the connector portion of the shaft, and is threaded into the axial bore of the plug of the club head for operatively connecting the shaft to the head.

Another example is U.S. Pat. No. 5,433,442 to Walker for Golf Clubs with Quick Release Heads. The Walker patent discloses a golf club in which the club head is secured to the shaft by a coupling rod and a quick release pin. The upper end of the coupling rod has external threads that engage the internal threads formed in the lower portion of the shaft. The lower end of the coupling rod, which is inserted into the hosel of the club head, has diametric apertures that align with diametric apertures in the hosel to receive the quick release pin.

Another example is U.S. Pat. No. 5,722,901 to Barron et al. for a Releasable Fastening Structure for Trial Golf Club Shafts and Heads. The Barron patent discloses a bayonet-style releasable fastening structure for a golf club and shaft. The club head hosel has a fastening pin in its bore that extends diametrically. The head portion of the shaft has two opposing "U" or "J" shaped channels. The head end portion of shaft fastens on the hosel pin through axial and rotary motion. A spring in the hosel maintains this fastenable interconnection, but allows manually generated, axially inward hosel motion for quick assembly and disassembly.

Another example is U.S. Pat. No. 5,951,411 to Wood et al. for a Hosel Coupling Assembly and Method of Using Same. The Wood patent discloses a golf club including a club head, an interchangeable shaft, and a hosel with an anti-rotation device. The hosel contains an alignment member with an angular surface that is fixed, by a stud, within the hosel bore. A sleeve secured on the shaft end forms another alignment arrangement element and is adapted to engage the alignment element disposed in the hosel bore. A capture mechanism disposed on the shaft engages the hosel to fix releasably the shaft relative to the club head.

Another example is U.S. Publ. Pat. App. No. 2001/0007835 A1 to Baron for a Modular Golf Club System and Method. The Baron publication discloses a modular golf club including club head, hosel, and shaft. A hosel is attached to a shaft and rotation is prevented rotation by complementary interacting surfaces, adhesive bonding or mechanical fit. The club head and shaft are removably joined together by a collet-type connection.

Another example is U.S. Pub. Pat. App. No. 2006/0105855 A1 to Cackett et al. for a Golf Club with Interchangeable Head-Shaft Connections. The Cackett publication discloses a golf club that uses a sleeve/tube arrangement instead of a traditional hosel to connect the interchangeable shaft to the club head in an effort to reduce material weight and provide for quick installation. A mechanical fastener (screw) entering the club head through the sole plate is used to secure the shaft to the club head.

Still another example is U.S. Pat. No. 6,547,673 to Roark for an Interchangeable Golf Club Head and Adjustable Handle System. The Roark patent discloses a golf club with a quick release for detaching a club head from a shaft. The quick release is a two-piece connector including a lower connector, which is secured to the hosel of the club head, and an upper connector, which is secured to the lower portion of the shaft. The upper connector has a pin and a ball catch that both protrude radially outward from the lower end of the upper connector. The upper end of the lower connector has a corresponding slot formed therein for receiving the upper connector pin, and a separate hole for receiving the ball catch. When the shaft is coupled to the club head, the lower connector hole retains the ball catch to secure the shaft to the club head. Other published patent documents, such as U.S. Pat. No. 7,083,529 and U.S. Publ. Pat. App. Nos. 2006/0287125, 2006/0293115, 2006/0293116 and 2006/0281575, disclose interchangeable shafts and club heads with anti-rotation devices located there between.

There remains a need in the art for golf clubs with an improved connection that provides a method for quickly and easily interchanging the shaft, removable weights and other attachments with the club head.

SUMMARY OF THE INVENTION

The invention is directed to a releasable connection system for assembling a golf club. The inventive connection system provides interchangeability between a shaft and a club head that imparts minimal visual impairment and club mass fluctuation while optimizing customization. Additionally, compared to prior art designs, the disclosed invention reduces the club head weight required for an adjustable hosel.

The invention describes systems for reversibly joining a club shaft to a club head, allowing the club head to be adjusted during the course of play. The system includes a fastener having a retaining shoulder that constrains movement of the fastener within the club head, thereby assuring that the fastener remains aligned with, e.g., a hosel opening, and that the fastener does not inadvertently leave the club head. In some embodiments, the club head comprises a retaining member that is added to the club head to maintain the position of the fastener. The retaining member may be constructed from a lightweight material, e.g., plastic, thereby reducing the weight necessary to maintain the position of the fastener. The system can be used with any type of club head/shaft system, however, it is beneficially used in a golf club such as a driver, hybrid, iron, or putter. The invention provides an additional advantage of ease of manufacture because a club head using the invention does not require casting an extension body to stabilize the hosel connector.

Golf club heads and golf clubs comprising a fastener for a reversible engagement with a shaft are also disclosed. The golf clubs or golf club heads include a hosel, a fastener having a retaining shoulder, and a retaining member coupled to a hole in a heel opening of the club head. The hole is substantially aligned with the hosel and the retaining member keeps the fastener aligned with a mating structure at the end of the golf club shaft. In some embodiments, the retaining member is a slotted sleeve. In other embodiments, the retaining member is a clip having tabs that retain the clip in the hole.

In another embodiment, the present invention includes a connection system that comprises a two-part hosel, wherein a first hosel part is connected to the shaft and a second hosel part is connected to the club head, and an anti-rotation device is disposed between the first and second hosel parts, and the anti-rotation device is located above the club head. The anti-rotation device can have a first serrated surface disposed on the first hosel part and a second corresponding serrated surface disposed on the second hosel part. The first and second serrated surfaces mate to minimize relative rotation between the shaft and the club head.

In another embodiment, the connection system comprises a hollow sole insert affixed in a hosel bore proximate a sole of the club head, wherein a first key is disposed on an internally threaded distal end of the shaft and a second corresponding key is disposed on the sole insert. As a fastener is inserted through the sole insert and into the threaded distal end of the shaft to connect the shaft to the club head, the first and second keys mate with each other to minimize relative rotation between the shaft and the club head.

In another embodiment, the connection system comprises a spring loaded bayonet mount, wherein the spring has a spring constant from about 5 pounds-force/inch to about 100 pounds-force/inch and wherein the spring loaded bayonet mount is located above the club head. The bayonet mount comprises at least one post disposed on the shaft and at least one corresponding channel disposed on a hosel of the club head and the bayonet mount further comprises a spring disposed within the hosel. The channel may have a reduced diameter section sized and dimensioned to releasably retain said post. Alternatively, the bayonet mount comprises two or more posts disposed on the shaft and two or more corresponding channels disposed on a hosel of the club head.

In another embodiment, the connection system comprises a hosel rotatable connection comprising a first hosel sheath, a second hosel part and an anti-rotation device. The first hosel sheath is connected to the shaft; the second hosel part is preferably made integral to the club head, and an anti-rotation device is disposed between the first and second hosel parts, and the anti-rotation device is preferably located above the club head. The anti-rotation device can have a first serrated surface disposed on the first hosel sheath and a second corresponding serrated surface disposed on the second hosel part. The first and second serrated surfaces mate to minimize relative rotation between the shaft and the club head. The hosel sheath has distal internal threads that threadably mate with the external threads on the second hosel part connected to the club head to hide the anti-rotation device to preserve the esthetics of the club head. In another embodiment, the first rotatable hosel sheath is connected to the hosel.

In another embodiment, the connection system comprises two or more legs of uneven lengths connected to the shaft. One of the legs is an affixing leg and the other leg is a non-affixing leg. Corresponding receiving areas are provided in the hosel. The two or more legs cooperate to minimize relative rotation between the shaft and the club head. The affixing leg preferably is threaded to the hosel.

Preferably the threaded connections of the embodiments of the present invention comprise multiple parallel threads to maintain the thread count of the connection, thereby improving the strength of the connection, while minimizing the time required connecting the threaded connectors together.

In another embodiment, the connection system comprises a wedge hosel connected to the shaft, a club head insert disposed within the club head and a wedge screw threaded to the wedge hosel through the heel of the club head to retain the wedge hosel to the club head and to the club head insert. The anti-rotation device comprises a first serrated surface disposed on the wedge hosel and a second corresponding serrated surface disposed on the club head insert. The wedge screw also minimizes club head rotation relative to the shaft.

In another embodiment, the connection system comprises a bendable hosel, club head insert, and anti-rotation device. The bendable hosel is connected to the shaft, and the shaft-hosel assembly is connected to the club head via a screw. The connection system further comprises a cap disposed below the screw head to retain the screw within the club head during connection and disconnection. An anti-rotation device is also provided.

A hosel insert adapted to change the loft and/or lie angle of the club is also provided. A dampener or spring can be placed within the connection system to minimize vibration during impacts.

In another embodiment, the anti-rotation device comprises first tapered projections operatively connected to the shaft and second tapered projections operatively connected to the club head, wherein the first and second tapered projections are sized and dimensioned so that when the shaft is connected to the club head a gap is formed between at least some of the tapered projections and the shaft or club head. This gap assists the two projections to fit flush together when assembled.

The inventive connection system may also comprise a threaded connection, wherein said threaded connection comprises a first threaded surface operatively connected to the shaft, a corresponding second threaded surface operatively connected to the club head and a helical coil insert adapted to fit between the first and second threaded surfaces.

BRIEF DESCRIPTION OF THE DRAWINGS

In the accompanying drawings, which form a part of the specification and are to be read in conjunction therewith and in which like reference numerals are used to indicate like parts in the various views:

FIG. 10A is an exploded view of another embodiment of the inventive connection system; FIG. 10B is a perspective view of the assembled club head, sheath, shaft, and inserts of FIG. 10A.

FIG. 14A is a partial cross-sectional view of a club head adapted for use with another embodiment of the inventive connection system; FIG. 14B is an enlarged perspective view of a wedge hosel of FIG. 14A; FIG. 14C is an exploded view of shaft and wedge hosel; FIG. 14D is a perspective view of assembled shaft and wedge hosel of FIG. 14A; FIG. 14E is an enlarged perspective view of wedge screw; and FIG. 14F is a partial cross-sectional view of assembled club of this embodiment.

FIG. 15A is a partial cross-sectional view of a club head for use with another embodiment of the inventive connection system; FIG. 15B is a perspective view of a bendable hosel; FIG. 15C is an exploded view of the shaft, bendable hosel and shaft insert; FIG. 15D is an exploded view showing the club head of FIG. 15A and the assembled shaft and hosel of FIG. 15C;

FIG. 16A is an exploded view of FIG. 15D with a system for retaining the screw in the club head; FIG. 16B is a partial cross-sectional view of the assembled golf club; FIG. 16C is an enlarged perspective view of one embodiment of the retaining system; FIG. 16D is an enlarged cross-sectional view of the club head bore adapted to receive the retainer of FIG. 16C; and FIG. 16E is an enlarged perspective view of another embodiment of the retainer;

FIGS. 19A-C are perspective views of an alternative to the anti-rotation feature of the present invention; FIG. 19D is a schematic view of another serrated anti-rotation surfaces.

DETAILED DESCRIPTION

The present invention is directed to a quick connection system for connecting the shaft to a club head and for changing the shaft or the club head to optimize the golfer's strength to the playing conditions. Such a system can be utilized or customized for various applications, including, but not limited, to the shaft-club head connection, the insertion of adjustable weights in the club head, and the connection of a sole plate to the club head. The invention can also be used to change the trajectory properties of the golf club, e.g., by changing the loft angle. Several embodiments of the present invention are described below. In some embodiments, the designs offer improved functionality and weight savings.

Figure 1:
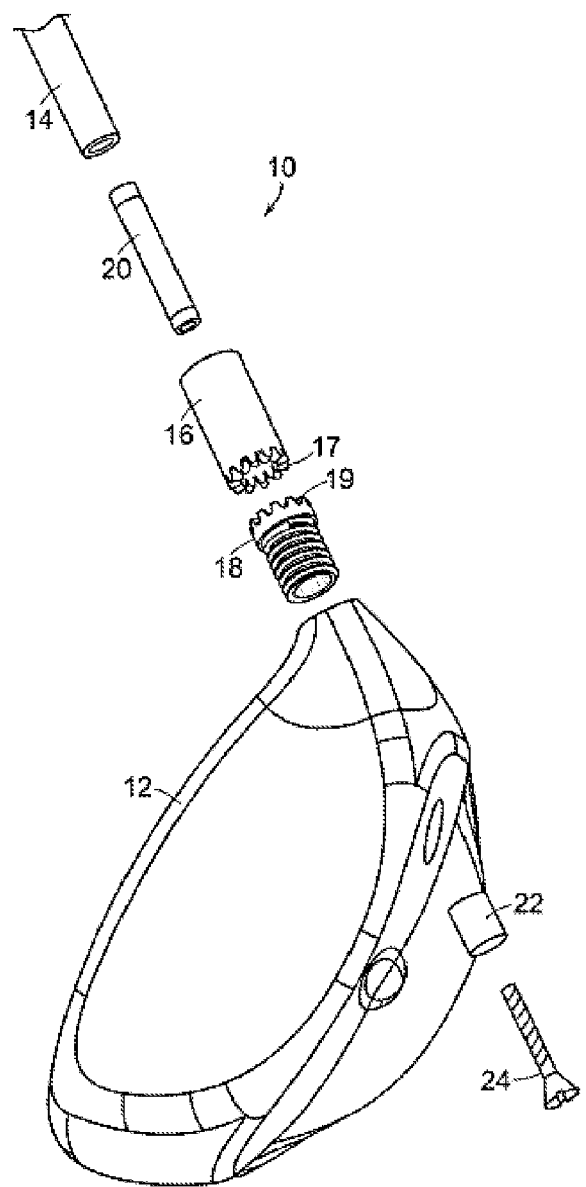
FIG. 1 is an exploded view of an exemplary driver club showing a shaft, a club head and a first embodiment of the inventive connection system.
Figure 2:
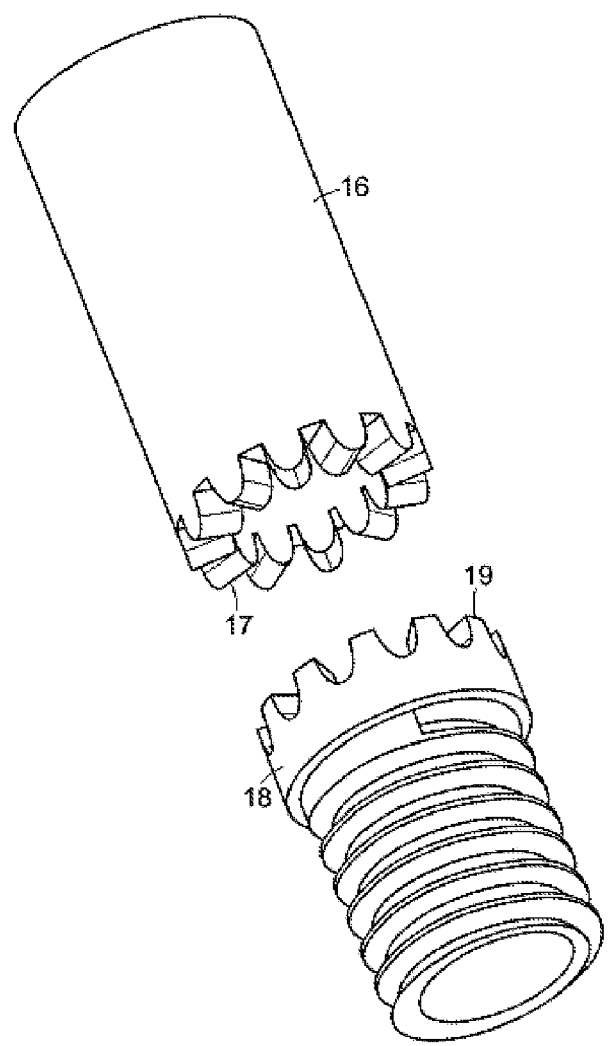
FIG. 2 is an exploded view of the two-part hosel of the connection system of FIG. 1.
Figure 3:
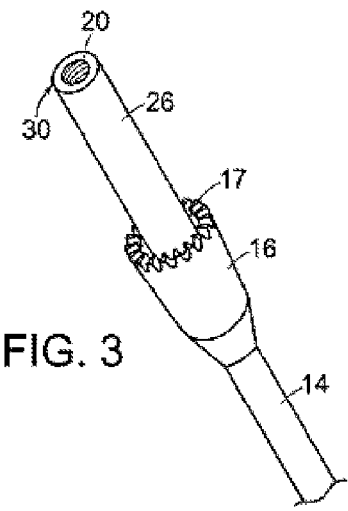
FIG. 3 is a perspective view of the assembled shaft.

Inventive connection system 10 is designed for club fitters to repeatedly change shaft or club head combinations during a fitting session. Inventive connection system 10 is designed to give fitting accounts maximum fitting options with a system that is fast and easy to use. Referring to FIGS. 1 and 2, connection system 10 releasably connects club head 12 to shaft 14, such that different shafts 14 can be connected to different club heads 12. Connection system 10 comprises a two-part hosel, i.e., shaft serrated hosel 16 and driver serrated hosel 18 and internally threaded shaft insert 20. Serrated surface 17 of shaft hosel 16 and serrated surface 19 driver hosel 18 are sized to mate with each other to minimize or prevent relative rotation between shaft hosel 16 and driver hosel 18. Preferably, each serrated surface comprises a plurality of corresponding teeth. Connection system 10 further comprises driver sole insert 22 and screw 24, which are connected to club head 12 on the sole side, as shown. As best shown in FIG. 3, shaft 14 is at least partially hollow and is sized and dimensioned to receive and retain internally threaded shaft insert 20 therewithin. Preferably, shaft insert 20 is securely attached to shaft 14 by means of adhesives, epoxies or similar materials. Shaft serrated hosel 16 is sized and dimensioned to fit on the outside of shaft 14. A predetermined length 26 of shaft 14 is positioned below shaft serrated hosel 16 for insertion into club head 12. The internal threads of shaft insert 20 are adapted to receive the external threads of fastener 24, such as screw 24.

Figure 4:
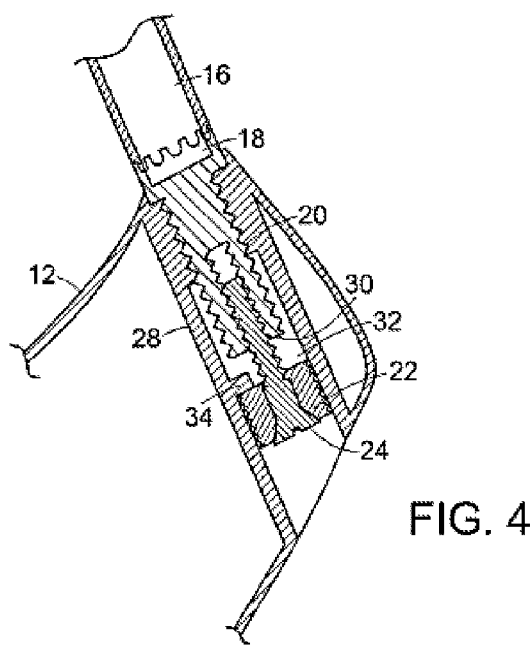
FIG. 4 is a partial cross-sectional view of the connection system of FIG. 1.

As best shown in FIG. 4, driver serrated hosel 18 has external threads, as shown, and is threaded into the top of bore 28 of club head 12. Adhesives or epoxies can also be used to affix driver serrated hosel 18 to bore 28. At the bottom of bore 28, driver sole insert 22 is inserted into bore 28 and affixed therein. Preferably, driver sole insert 22 is serrated or threaded on the outside surface to increase the surface area to adhesives or epoxies. The assembled shaft 14 with shaft insert 20 and shaft hosel 16 as shown in FIG. 3 is inserted through driver hosel 18 and into bore 28. Screw 24 is inserted through driver sole insert 22 and is threaded into shaft insert 20 to secure shaft 14 to club head 12. Preferably, distal tip 30 of shaft 14 is spaced apart from the top of driver sole insert 22 and shaft 14 and driver sole insert 22 is separated by gap 32. Gap 32 ensures that screw 24 can fully pull shaft 14 downward toward the sole of club head 12 so that serrated surfaces 17 and 19 fully engage each other to minimize relative rotation between the two hosels 16 and 18 thereby minimizing relative rotation between shaft 14 and club head 12. In other words, gap 32 ensures that screw 24 does not "bottom out" inside threaded shaft insert 20 so that serrated hosels 16 and 18 can fully mate with each other.

Figure 5:
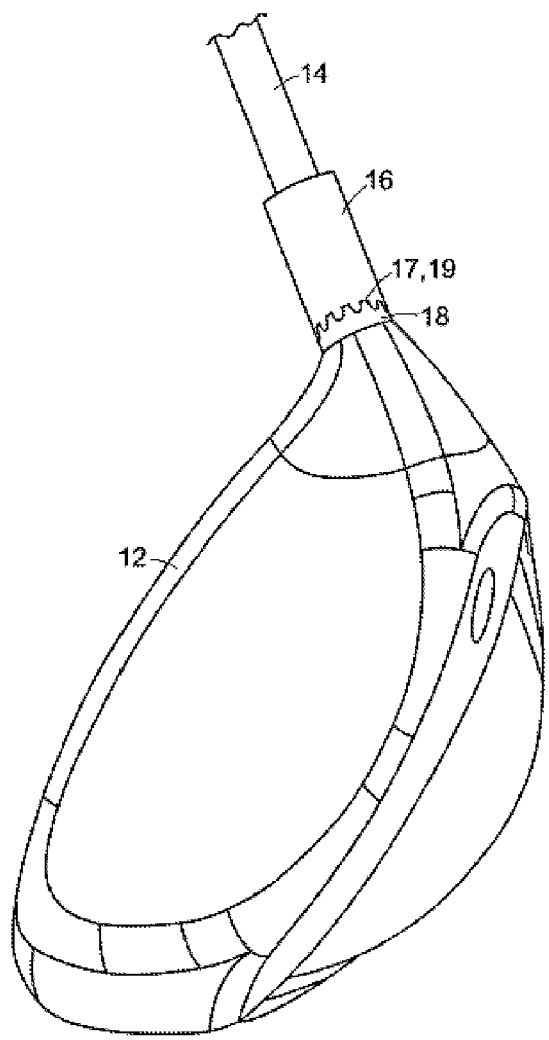
FIG. 5 is a perspective view of the assembled driver club of FIG. 1.

Optionally, bore 28 has ledge 34 shown in FIG. 4 formed integrally thereon, e.g., through the casting process, to abut driver sole insert 22 to provide additional structural support for driver sole insert 22 and screw 24. Alternatively, driver sole insert 22 can be formed integrally on bore 28. These alternatives are applicable to all of the embodiments described herein. Referring to FIG. 5, a fully assembled golf club is shown. Serrated hosels 16 and 18 form a single hosel and the serrated lines 17 and 19 separating the two hosels are preferably located above the top of club head 12. The advantage of locating the anti-rotation device, i.e., shaft serrated hosel 16 and driver serrated hosel 18, above the club head is that no additional mass is added, thereby preserving the mass properties of the club head and eliminating a protrusion at the shaft/hosel intersection. The anti-rotation device uses a standard hosel to make both the shaft serrated hosel and the driver serrated hosel. This means there is no weight gained or lost from the device, which in turn means no change in moment of inertia or center of gravity. Furthermore, serrated lines 17 and 19 add a visual distinction to the golf club and readily identify the golf club as an interchangeable golf club.

Driver sole insert 22 and shaft threaded insert 20, as well as hosel insert 16 and/or hosel insert 18, can be made out of aluminum, stainless steel or titanium. Screw 24 can be any threaded screw, and is preferably a TORX™ drive flat head screw and the sole insert 22 is tapered so that the head of screw 24 can be flushed with sole insert 22, as best shown in FIG. 4.

Figure 6:
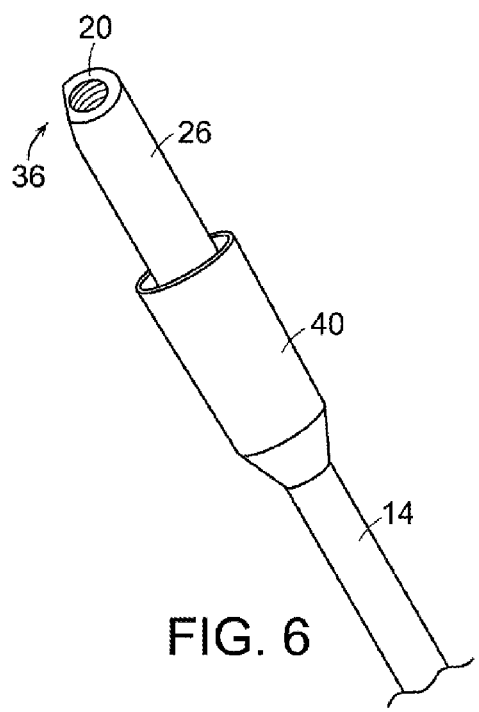
FIGS. 6 and 7 are perspective views another embodiment of the inventive connection system.
Figure 7:
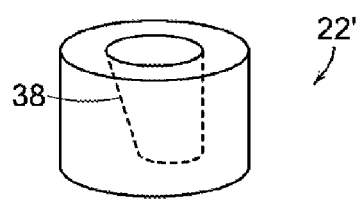
Figure 8:
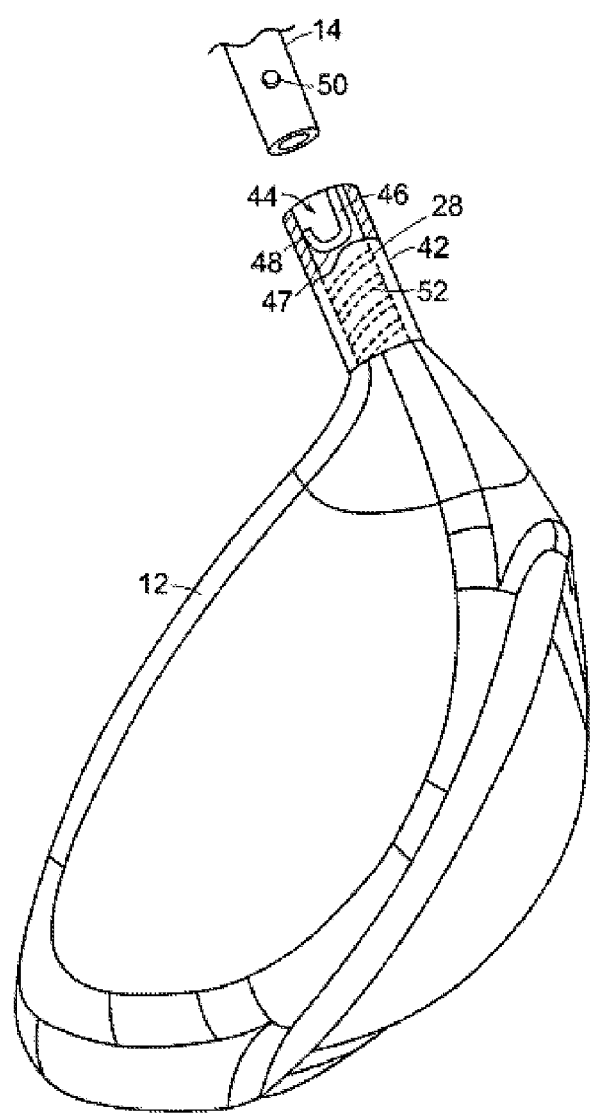
FIG. 8 is an exploded view of an exemplary driver club and another embodiment of the inventive connection system.

Referring to FIGS. 6 and 7, another embodiment of connection system 10 is shown. In this embodiment, the two-part hosel of the first embodiment is replaced by a keyed anti-rotation device. This keyed anti-rotation device comprises angled cut-out 36 on the distal tip of shaft 14. Shaft 14 is also hollow and has threaded shaft insert 20 inserted therein and conventional hosel 40 disposed thereon. Driver sole insert 22' has angled surface 38 sized and dimensioned to match cut-out 36. In this embodiment, shaft 14 is inserted into driver sole insert 22', and angled cut-out 36 is keyed to angled surface 38 as screw 24 is threaded into shaft insert 20 to minimize or prevent relative rotation between shaft 14 and driver sole insert 22'/club head 12. An advantage of this embodiment is that an anti-rotation device can be added without adding substantial weight to the club head thereby minimizing the effect on the club's swing weight. Referring to FIG. 8, another embodiment of connection system 10 is shown. In this embodiment, bore 28 does not extend through club head 12. Club head 12 has hosel 42, which has at least one and preferably two or more channels 44. Channel 44 has entry leg 46 and locking leg 48. Leg 46 is adapted to receive post 50 on shaft 14. After post 50 travels through entry leg 46, it passes transverse leg 47 before being received and held in locking leg 48. Disposed within hosel 42 is spring 52 that exerts an upward force on shaft 14 to hold securely post 50 in locking leg 48. Spring 52 is selected so that it can exert a sufficient force to hold post 50 within channel 44. Preferably, spring 52 has a spring constant from about 5 to about 100 pounds-force/inch. More preferably, the spring constant can be in the range of about 20 to about 75 pounds-force/inch and most preferably about 33 pounds-force/inch. A golfer can conveniently insert shaft 14 into hosel 42 after aligning post 50 to leg 46. Thereafter, shaft 14 is rotated along transverse leg 47 and afterward spring 52 pushes shaft 14 up locking leg 48. Post 50 and channel 44 is also known as a bayonet mount or connection.

Figure 8A:
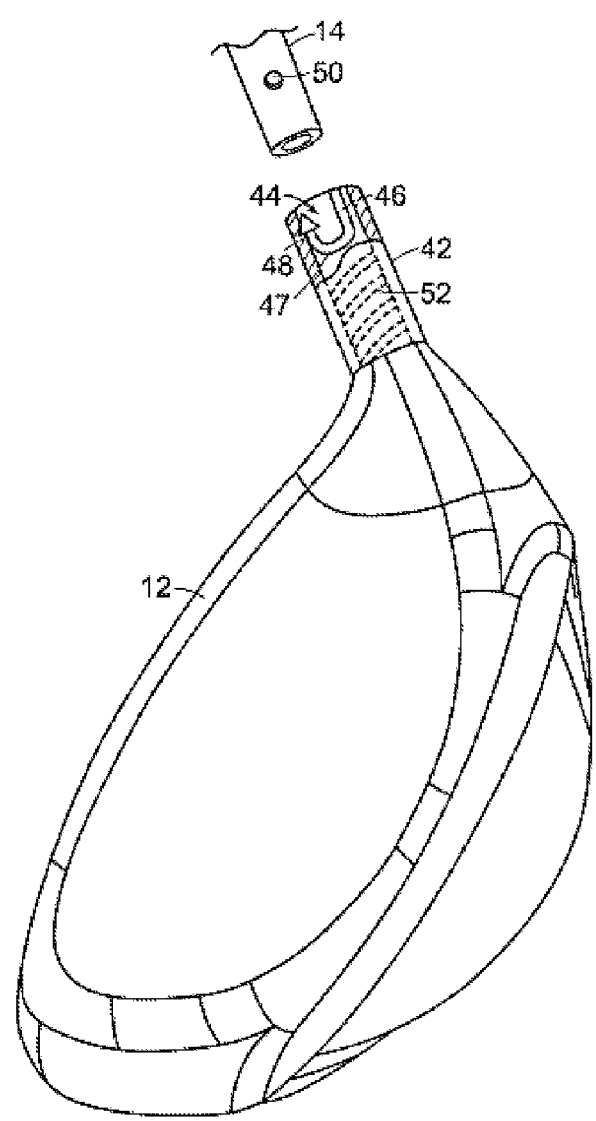
FIGS. 8A and 8B are alternatives of the embodiment of FIG. 8.
Figure 8B:
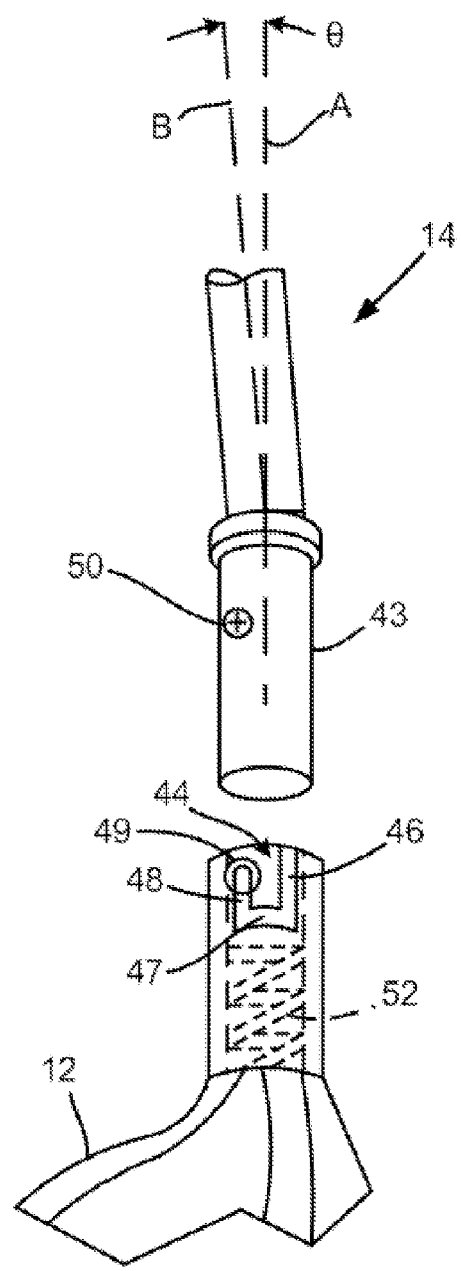

Although channel 44 is illustrated as a "J-shaped" channel, it can have any shape, e.g., "U", "L", "S", "V" or "W" shape. Also, preferably leg 46 is preferably deep so that as post 50 is moved down into hosel 42, more of shaft 14 overlaps hosel 42 to increase mechanical stability. Alternatively, the top of locking leg may have a reduced diameter section to hold post 50 by press-fit or by increased friction. As illustrated in FIG. 8A, the reduced diameter section can be a triangular section. The reduced diameter section can also be a figure-eight or waist section. In another embodiment, shown in FIG. 8B, the connection system provides adjustability of an angular attribute of golf club head 12 relative to shaft 14, such as face angle, loft and lie. Similar to previous embodiments, club head 12 includes hosel 42, but in the present embodiment, hosel 42 has at least two channels 44 so that the shaft may be positioned in at least two discrete orientations relative to head 12. For example, shaft 14 may be coupled to hosel 42 in a first orientation and in a second orientation in which the shaft is rotated about a longitudinal axis of hosel 42 from the first orientation. Channels 44 are spaced circumferentially around hosel 42 and each channel 44 has entry leg 46 and locking leg 48.

Shaft 14 includes a distal engagement portion 43 and a proximal portion that extends from the distal portion to a grip end of shaft 14. In an assembled golf club, engagement portion 43 is at least partially received in hosel 42 and coupled thereto. The engagement portion may comprise a separate sleeve component that is attached to shaft 14 or it may be formed as an integral part of shaft 14 during the manufacture. Engagement portion 43 is a generally elongate portion of shaft 14 that is shaped to engage hosel 42 and defines a longitudinal axis A. The engagement portion of shaft 14 defines a longitudinal axis B that is angled relative to axis A by an angular offset θ. By providing at least two discrete orientations of shaft 14 relative to head 12 and angular offset θ, an angular attribute of club head 12 relative to shaft 14 may be altered. Preferably, the angular offset θ ranges from about 0.5° to about 5.0°. At least one post 50 is included on engagement portion 43. Post 50 extends radially outward from an outer surface of engagement portion 43 and is configured to engage channel 44. Preferably, shaft 14 includes the same number of posts 50 as channels 44. For example, in an embodiment that includes two channels circumferentially spaced about the hosel by 180° also, preferably includes two posts circumferentially spaced about the engagement portion by 180°. In the present embodiment, post 50 is a screw that engages a threaded bore in engagement portion 43 and is therefore movably coupled to engagement portion 43.

In channel 44, leg 46 is adapted to receive post 50 on shaft 14. After post 50 travels through entry leg 46, it passes transverse leg 47 before being received and held in locking leg 48. Disposed within hosel 42 is spring 52 that exerts an upward force on shaft 14 to hold securely post 50 in locking leg 48. Spring 52 is selected so that it can exert a sufficient force to hold post 50 within channel 44. Additionally, the top of locking leg may include a receptacle 49 that receives a portion of post 50 to prevent relative motion between shaft 14 and club head 12 when post 50 is fully engaged in channel 44. For example, the screw may be configured to lock into receptacle 49 when the screw is tightened, such as by forming receptacle as a countersunk portion of locking leg 48 and engaging it with a countersunk screw head.

Figure 9:
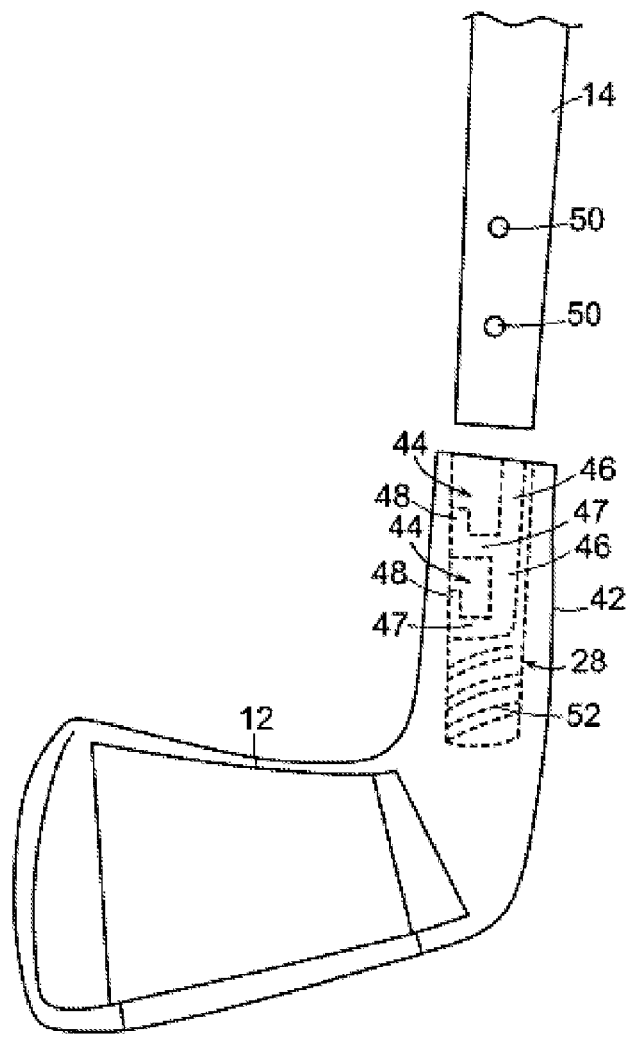
FIG. 9 is an exploded view of an alternative of the embodiment of FIG. 8 illustrated with an iron club.

FIG. 9 illustrates another variation of the embodiment of FIG. 8, where hosel 42 has two or more channels 44. Channels 44 can have the shapes or configurations of those described in FIGS. 8 and 8A. An advantage of this embodiment is that having two or more locking legs 48 prevents twisting at the lower end of the leg and it offers a back up should one of the locking legs 48 fail.

Referring to FIGS. 10A to 10D, another embodiment of connection system 10 comprises a first rotatable hosel sheath 70 with internal threads and a second threaded, hollow hosel part 72, which is fixedly attached to club head 74. Preferably, second threaded hosel part 72 is made integral to club head 74, and hosel sheath 70 and hosel part 72 are sized and dimensioned to threadably attach to each other to connect shaft 14 to club head 74. Connection system 10 further comprises an anti-rotation device, made up of first serrated surface 76 disposed on inner shaft insert 80 and corresponding second serrated surface 78 disposed on second threaded hosel part 72.

Figure 10C:
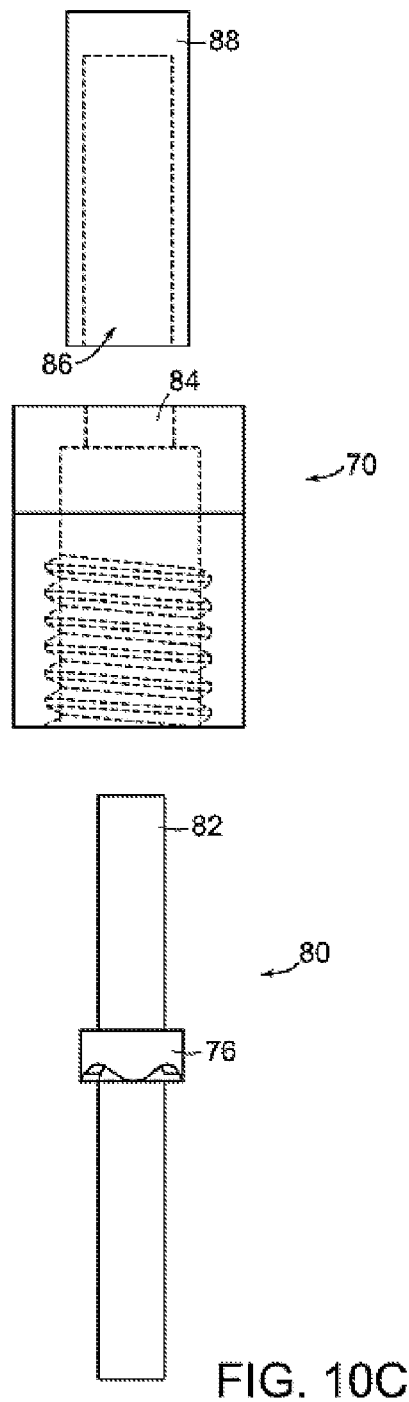
FIG. 10C is an exploded view of inner shaft insert, sheath, and outer shaft insert of FIG. 10A.

To assemble the club, upper end 82 of inner shaft insert 80 is inserted into the threaded end of rotatable hosel sheath 70, as shown in FIG. 10C. End 82 is sized and dimensioned to pass through aperture 84 of hosel sheath 70, but the top portion of serrated surface 76 is retained within hosel sheath 70. End 82 is then inserted into aperture 86 and finally attached to outer shaft insert 88. After end 82 of inner shaft insert 80 is fixedly connected to outer shaft insert 88, there is sufficient clearance for first hosel sheath 70 to be freely rotatable to connect to second hosel part 72. Preferably, the length of end 82 is dimensioned so that once end 82 is fully inserted into aperture 86, there remains sufficient clearance between outer shaft insert 88 and hosel sheath 70 for hosel sheath 70 to rotate freely. Outer shaft insert 88 is then inserted into shaft 14. Alternatively, inner sheath insert 80 is inserted into and attached directly to shaft 14 and outer sheath insert 88 can be omitted.

Figure 10D:
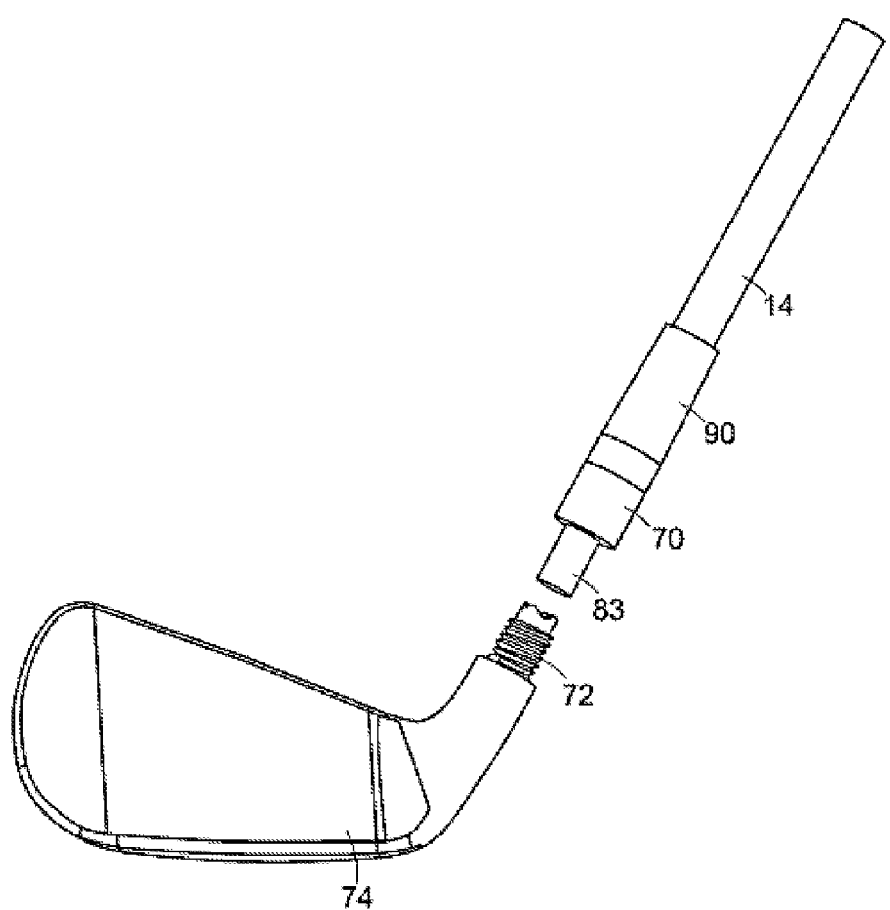
FIG. 10D is an exploded view of shaft inserts, sheath, and assembled shaft and club head of FIG. 10A.

Although this embodiment of the present invention is particularly suited to hosel sheath 70 made of metal, hosel sheath 70 can be made of high impact transparent or translucent materials. Suitable materials include, but are not limited to, polymethacrylate, cellulose acetate butyrate, polycarbonate (Lexan®), and glycol modified polyethylene teraphthalate. Afterward, as shown in FIG. 10D, shaft 14, with decorative ferrule 90, hosel sheath 70 and both shaft inserts 80 and 88, is assembled with club head 74. More specifically, lower end 83 of inner shaft 80 is inserted into second hosel part 72 to allow corresponding threads of hosel sheath 70 and hosel part 72 to mate and connect shaft 14 to club head 74. End 83 may extend partially or fully into club head 74. Serrated surfaces 76 and 78 also mate to minimize relative rotation between the shaft and the club head.

Referring to FIGS. 11A to 11D, another embodiment of connection system 10 comprises a rotatable hosel reverse sheath 92 with internal threads and a threaded, hollow shaft insert 94, which is fixedly attached to shaft 14. Hosel reverse sheath 92 and shaft insert 94 are sized and dimensioned to threadably attach to each other to connect shaft 14 to club head 98. Connection system 10 further comprises an anti-rotation device, made up of first serrated surface 100 disposed on club insert 102 and corresponding second serrated surface 104 disposed on shaft insert 94.

Figure 11B:
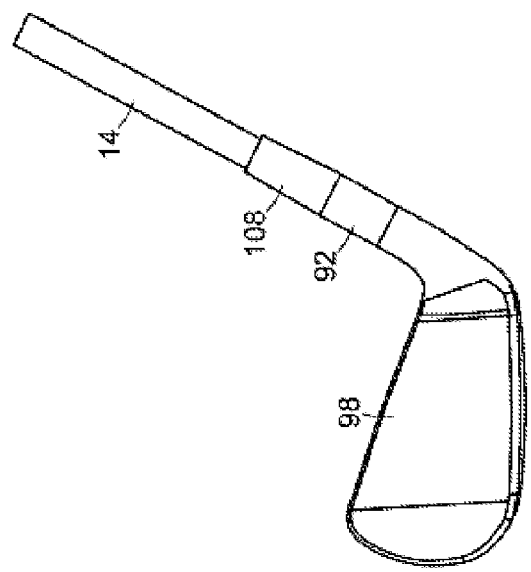
FIG. 11B is a perspective view of the assembled club head, reverse sheath, shaft and insert of FIG. 11A.
Figure 11A:
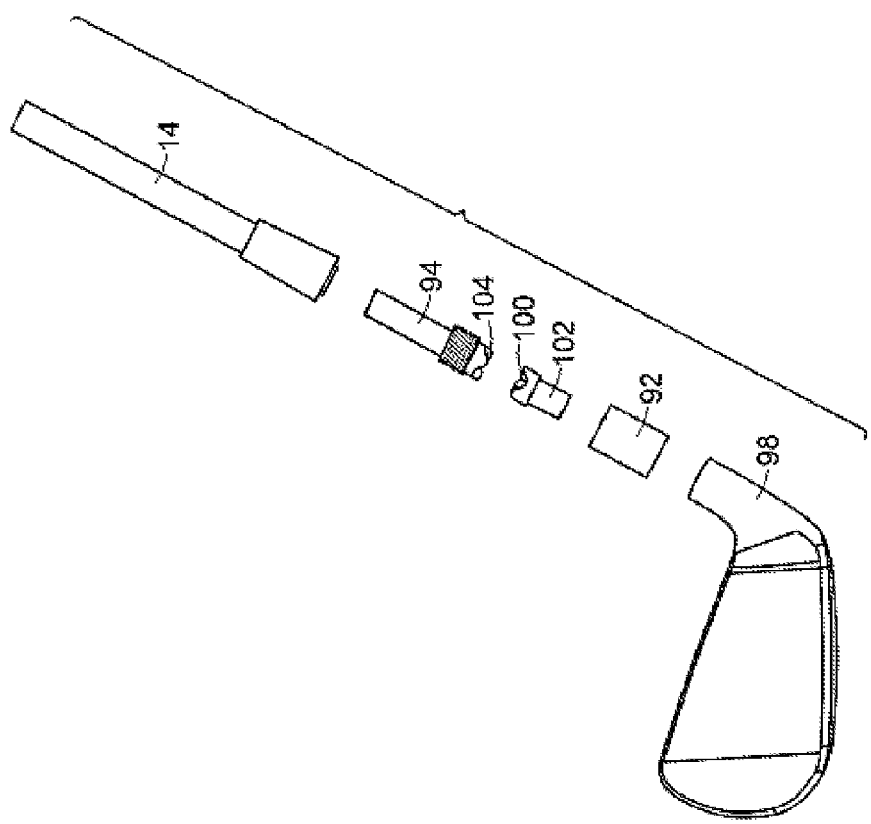
FIG. 11A is an exploded view of another embodiment of the inventive connection system.
Figure 11C:
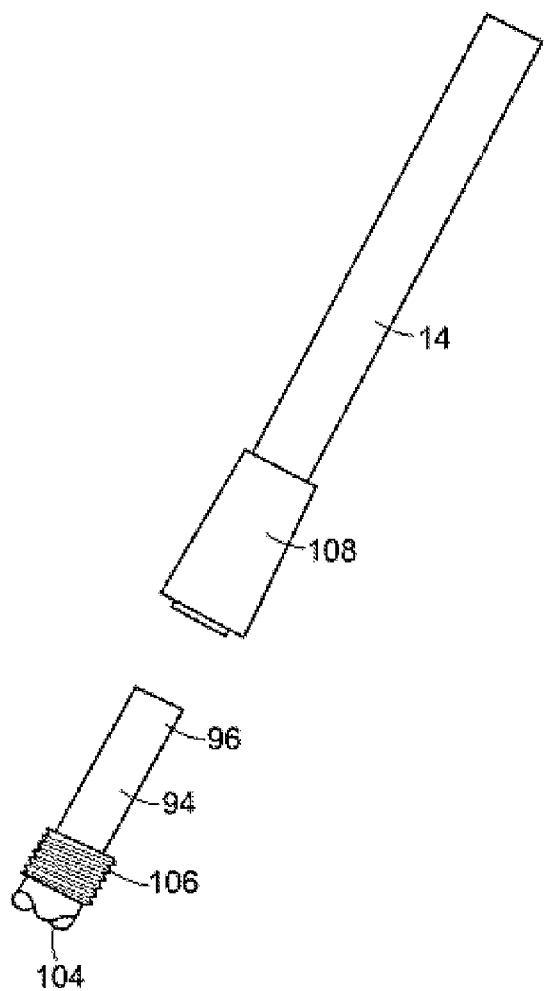
FIG. 11C is an exploded view of shaft insert and shaft of FIG. 11A.

To assemble the club, upper end 96 of shaft insert 94 is inserted into and fixedly connected to shaft 14 for example by adhesive or epoxy, as shown in FIG. 11C. Preferably, the length of end 96 is dimensioned so that there is a sufficient bond between shaft insert 94 and shaft 14. Threads 106 and second serrated surface 104 should remain outside of shaft 14 and next to decorative ferrule 108.

Figure 11D:
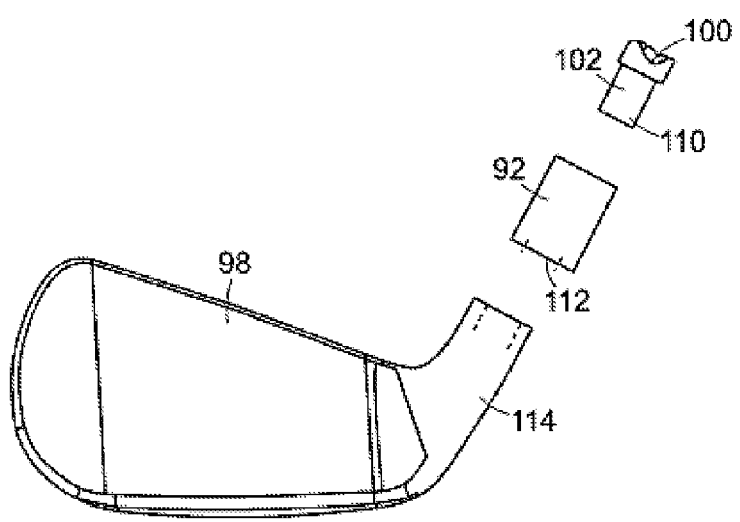
FIG. 11D is an exploded view of iron insert, reverse sheath, and club head of FIG. 11A.
Figure 12A:
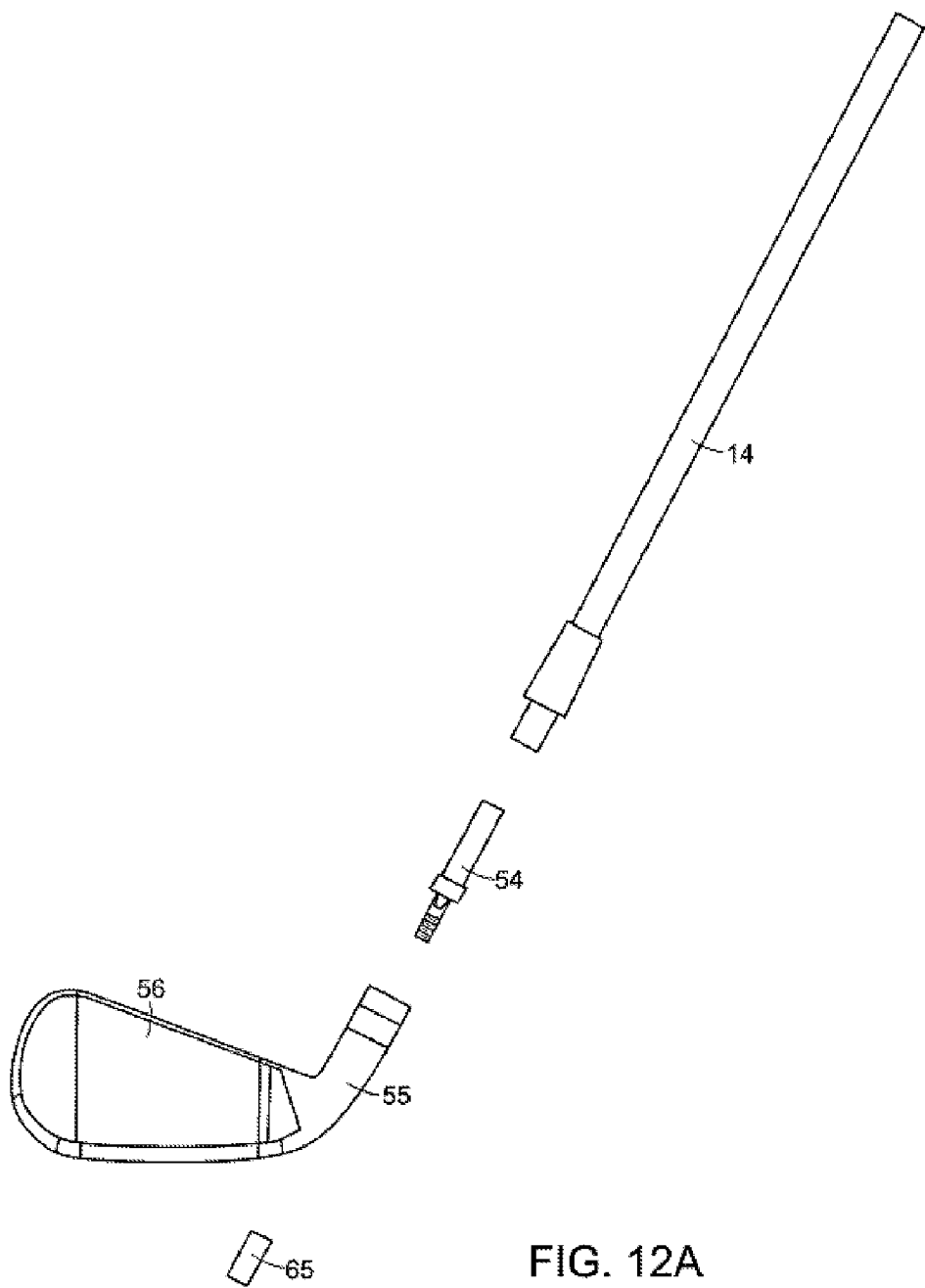
FIG. 12A is an exploded view of another embodiment of the inventive connection system.
Figure 12C:
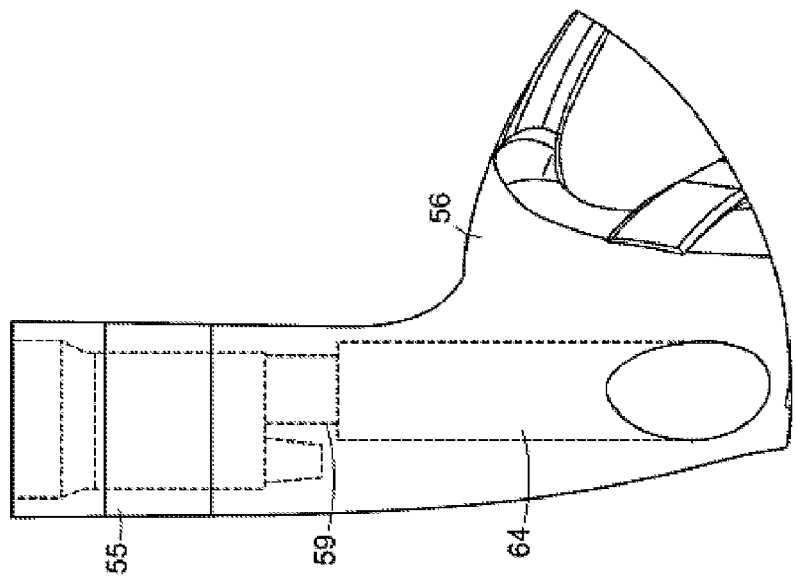
FIG. 12C is a partial rear, exploded hosel and club head of FIG. 12A.
Figure 12B:
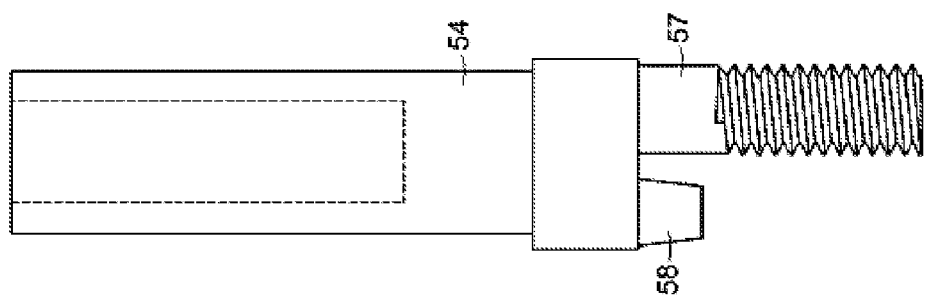
FIG. 12B is a perspective view of shaft insert of FIG. 12A.

As shown in FIG. 11D, lower end 110 of club insert 102 is inserted into reverse sheath 92. End 110 is sized and dimensioned to pass through aperture 112 of reverse sheath 92, but the bottom portion of serrated surface 100 is retained within rotatable reverse sheath 92. End 110 is then inserted into hosel 114 and is attached thereto. End 110 may extend partially or fully into club head 98 so long as there is sufficient clearance for reverse sheath 92 to rotate freely. To assemble the club, the assembled version of FIG. 11C is inserted into the assembled version of FIG. 11D. Serrated surfaces 100 and 104 mate to minimize relative rotation between the shaft and the club head and reverse hosel sheath 92 is rotated so that its internal threads mate with threads 106 of shaft insert 94 to connect club head 98 to shaft 14. Referring to FIGS. 12A to 12E, another embodiment of connection system 10 comprises hollow shaft insert 54 connecting shaft 14 to club head 56. Shaft insert 54 comprises affixing leg 57 and non-affixing leg 58, which have uneven lengths, as best shown in FIG. 12B. Hosel 55 has receiving area 59 adapted to receive shaft insert 54.

Figure 12D:
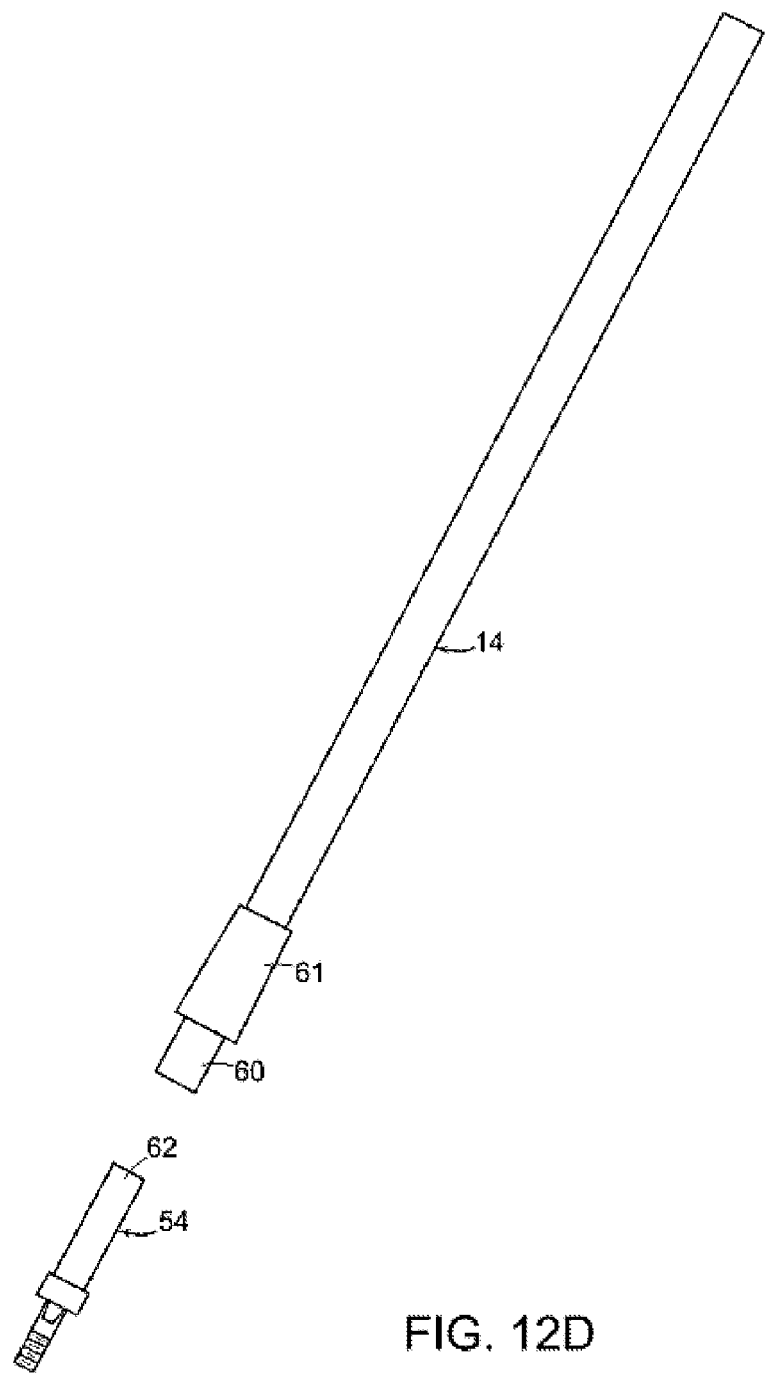
FIG. 12D is an exploded view of shaft and shaft insert of FIG. 12A.

To assemble the club, shaft tip 60 is maintained below decorative ferrule 61 disposed on shaft 14, as shown in FIG. 12D. Upper end 62 of shaft insert 54 is inserted into shaft tip 60, and shaft insert 54 is fixedly attached to shaft 14.

Figure 12E:
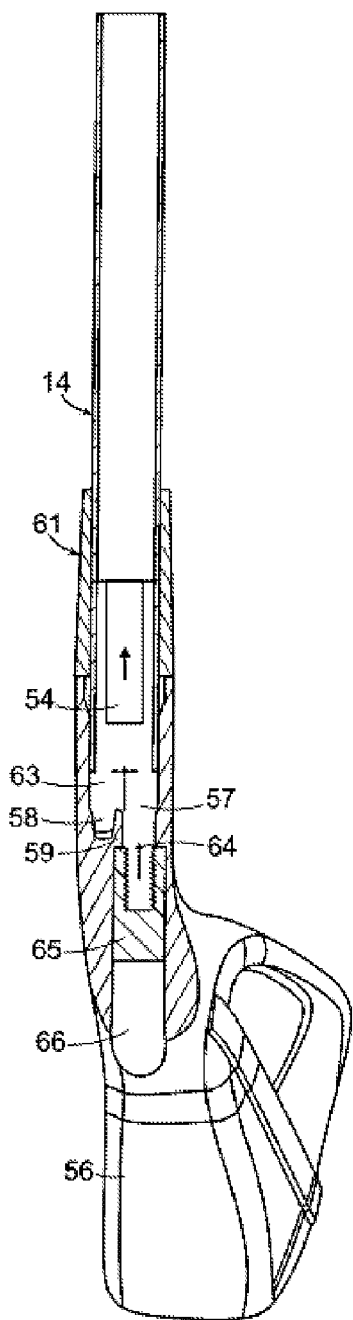
FIG. 12E is a partial cross-sectional view of assembled iron club of FIG. 12A.

Afterward, as shown in FIG. 12E, shaft 14, with decorative ferrule 61 and shaft insert 54 is assembled with club head 56. Specifically, lower end 63 of shaft insert 54 is inserted into receiving area 59 to connect shaft 14 to club head 56. More specifically, affixing leg 57 is inserted into aperture 64 and threadably attached to sole nut 65 in bore 66 of club head 56, while non-affixing leg 58 is mated to receiving area 59 to minimize relative rotation between the shaft and the club head. Preferably, non-affixing leg 58 is conical, wedge, or other key shape. Referring to FIGS. 1 to 12E and 14A to 15G, the embodiments of the present invention are illustrated with various single thread fasteners. These fasteners can be right-handed or left-handed and can have single thread or multiple threads. These fasteners need to be sufficiently strong to withstand repeated impacts between the golf club and the balls. An impact can create a force of up to 2,000 lbs. and depending on the location of the impact on the hitting face, connection system 10 may experience a torque load of 2,000·x, where x is a distance between the impact location and the neutral axis of the club. For example, a toe impact would produce more torque than a center impact. A heel impact would produce more torque (reverse direction) than a center impact. The density of threads and the dimensions of the threads should be designed to withstand the torque produced by toe and heel impacts.

Figure 13A:
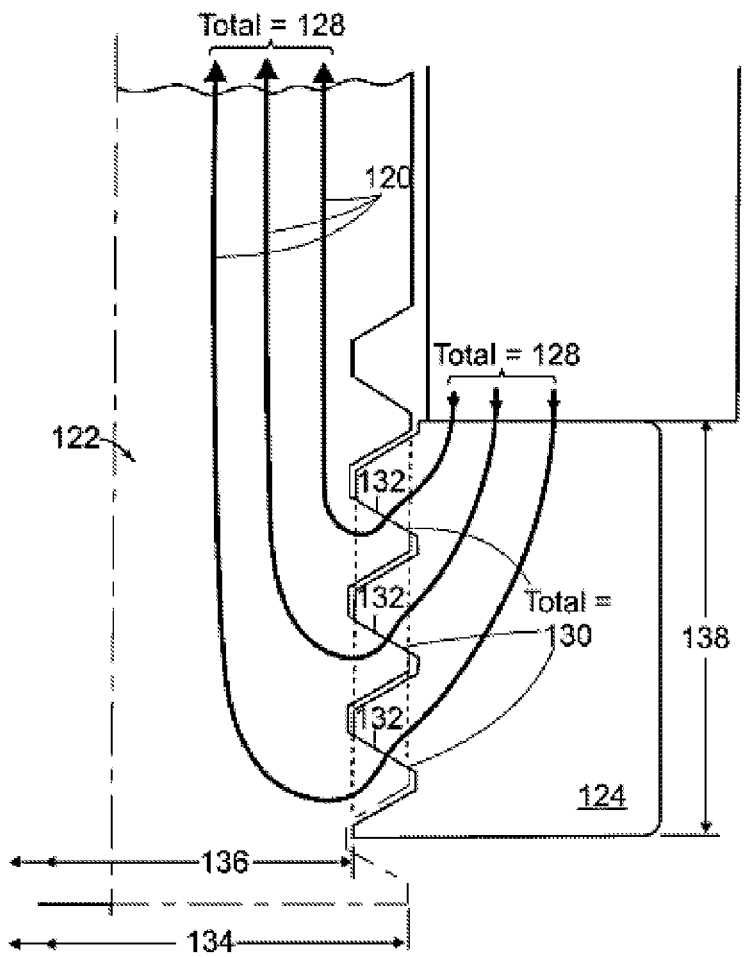
FIG. 13A is a force-flow through a set of threaded fasteners.
Figure 13B:
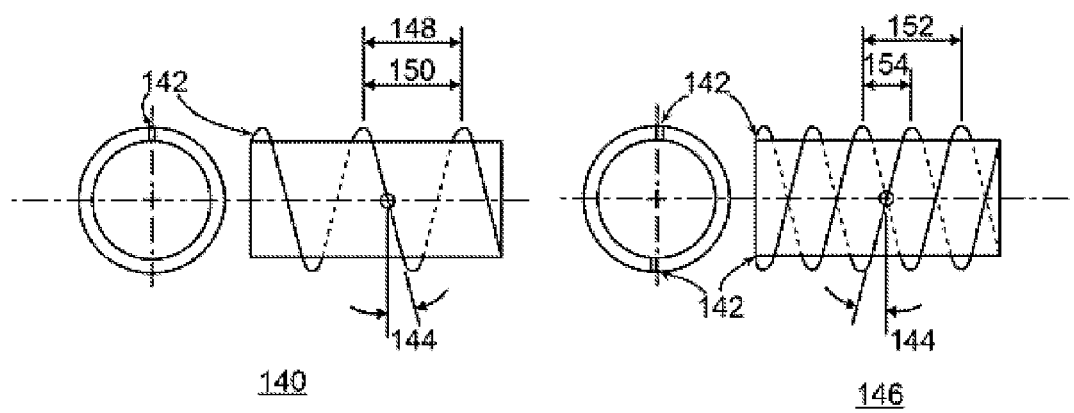
FIG. 13B is a single threaded right-hand and double threaded left-hand fastener.

FIG. 13A illustrates the force-flow lines 120 through a set of threaded fasteners used to clamp two members together. (Further detail can be found in *Fundamentals of Machine Component Design* by Robert C. Juvinall, copyright 1983, by John Wiley & Sons, Inc.) Direct compressive stress, often called bearing, exists between threaded fastener 122 and corresponding fastener 124. Stress (σ) is defined as load (P) 128 divided by the cross sectional area (A) 130 that exists when the load is acting: σ=P/A. In this particular situation, the area used for the P/A stress calculation is projected area 132 that, for each thread, is $\pi(d^2-d_i^2)/4$, where d 134 is outer diameter of fastener cylinder and $d_i$ 136 is inner diameter of fastener 122 contact with nut 124. The number of threads in contact is t/p, where t is fastener length of engagement 138 and p is fastener thread pitch, typically reported as inches per thread turn. (In practice, thread pitch is known by its reciprocal of threads per inch.) By substitution, $\sigma=(4P/\pi(d^2-d_i^2))\cdot p/t$. This equation demonstrates the advantage of more threaded contacts in the present invention, which is the strength of a set of threaded fasteners is proportionately increased by increasing the threaded fastener contacts. Preferably, fastener threads per inch is 12 to 36 threads/inch. More preferably, fastener threads per inch is 18 to 30 threads/inch and most preferably 24 threads/inch. Increasing fastener contacts could increase the golfer's fastener tightening and untightening time, which is undesirable to a method for quickly and easily interchanging the shaft, removable weights and other attachments with the club head. Typically, threaded fasteners comprise a single helical groove 140 disposed on a cylindrical rod from end thread 142, however if the helix angle 144 is increased other threads may be cut between the grooves of the first thread, so fasteners can have two 146 or more parallel threads, as shown in FIG. 13B. (Further detail can be found in *Fundamentals of Machine Component Design* by Robert C. Juvinall, copyright 1983, by John Wiley & Sons, Inc.) A fastener thread is assumed to be single thread, unless otherwise stated. Lead is the distance a threaded fastener advances axially in one turn. On a single threaded fastener 140, the lead 148 and pitch 150 are identical; on a double thread fastener 146, the lead 152 is twice the pitch 154, etc. The end result is that the threaded fastener will advance twice as far in a single turn on a double thread fastener than it would on a single thread fastener, etc., so double, triple, or more threads are used whenever rapid advance is desired. The advantage of multiple parallel threads is that the thread count of the fastener connection can be increased to strengthen the fastener connection while minimizing the golfer's time to connect the threaded connectors together. Preferably, fasteners will be multiple thread and have the same direction. More preferably, fasteners will be double thread and have the same direction. Referring to FIG. 13B, a thread may be either right-hand 140 or left-hand 146. Almost all threaded fasteners tighten, or move away from the viewer, when rotated clockwise; a left-hand thread advances when turned counterclockwise. A fastener thread is assumed to be right-hand unless otherwise stated. During use of an assembled golf club, swinging the golf club and hitting the ball tends to tighten or loosen threaded connections, depending on whether the club is right- or left-handed and whether the thread is right- or left-hand. For right-handed golf clubs, left-hand threading would tighten during ball striking; for left-landed golf clubs, right-hand threading would tighten during ball striking. Preferably, fastener threading would be matched to loosening and tightening needs, so that the club can be readily assembled and disassembled before and after use.

Referring to FIGS. 14A to 14E, another embodiment of connection system 10 comprises a wedge hosel 160 with tapered receiving area 162, a hollow club head insert 164 that is fixedly attached to club head 166, and a wedge screw 168 with a first smooth tapered end 170 and a second threaded cylindrical end 172. Tapered receiving area 162 of wedge hosel 160 is adapted to receive tapered head 170 of wedge screw 168. Connection system 10 further comprises an anti-rotation device, made up of first serrated surface 174 disposed on wedge hosel 160 and corresponding second serrated surface 176 disposed on club head insert 164. Additionally, when tapered head 170 is inserted into receiving area 162, tapered head 170 also minimizes relative rotation between club head 166 and shaft 14. Wedge screw 168 is preferably aligned substantially perpendicular or orthogonal to the shaft.

To assemble the club, shaft tip 178 is maintained below decorative ferrule 180 disposed on shaft 14, as shown in FIG. 14C. Upper end 182 of wedge hosel 160 is sized and dimensioned to fit on the outside of shaft 14, and wedge hosel 160 is fixedly attached to shaft 14 by means of adhesives, epoxies or similar materials. Shaft tip 178 is retained within wedge hosel 160, as shown in FIG. 14D. Preferably, upper end 182 of wedge hosel 160 is flush with decorative ferrule 180.

Club head insert 164 is inserted the top of bore 184 of club head 166 and affixed therein with diametric aperture 186 of club head insert 164 aligned with threaded side aperture 188 of club head 166. Preferably, club head insert 164 is serrated or threaded on its outside surface to increase the surface area to adhesives or epoxies. Alternatively, club head insert 164 is made integral to club head 166.

Thereafter, shaft 14 and wedge hosel 160 assembly, as shown in FIG. 14F, is inserted the top of bore 184 of club head 166. The interaction of serrated surfaces 174 and 176 of wedge hosel 160 and club head insert 164 directs shaft 14 within bore 184 so that tapered receiving area 162 of wedge hosel 160 aligns with side aperture 188 of club head 166. Tapered end 170 of wedge screw 168 is inserted through side aperture 188 of club head 166 into receiving area 162 of wedge hosel 160 and threaded end 172 of wedge screw 168 is releasably fastened into threaded side aperture 188 of club head 166.

Figure 14G:
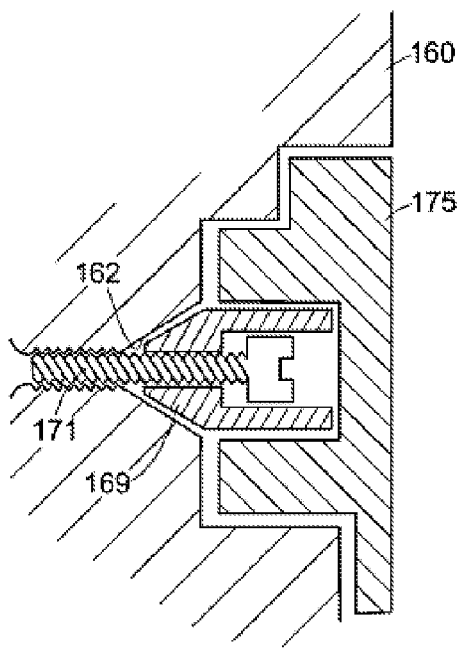
FIG. 14G is a cross-sectional view of another embodiment of the wedge hosel.
Figure 14H:
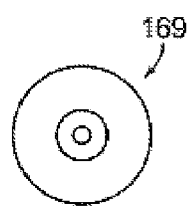
FIGS. 14H-I are top views of alternatives of the head of the wedge shown in FIG. 14G.
Figure 14I:
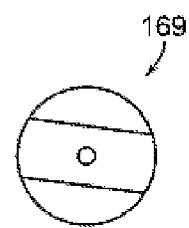
Figure 14J:
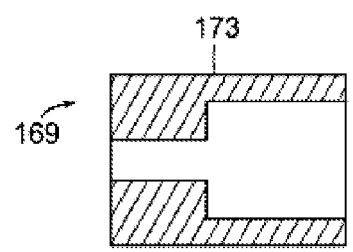
FIG. 14J is a cross-sectional view of an alternative of the body of the wedge shown in FIG. 14G.

Wedge 168 may comprise two components: wedge shell 169 and threaded fastener 171, as shown in FIGS. 14G-J. Fastener 171 fits within wedge shell 169 and is rotatably connecting hosel 160 to club head 12. The two-component wedge is similar to the one-component wedge, except that the threads are located on the inner threaded fastener 171 and wedge shell 169 has substantially smooth outer surface to fit snugly to receiving area 162. The end of wedge shell 169 can be conical, as shown in FIG. 14H or tapered, as shown in FIG. 14I. The conical end has an advantage of self-centering as two component wedge 168 is being inserted into hosel 160. The tapered end has an advantage of providing an anti-rotation tendency between wedge 168 and hosel 160. Alternatively, wedge housing 169 can have a cylindrical outer shape as shown in FIG. 14J. In the cylindrical embodiment, all of outer surface 173 is in contact with hosel 160 to provide enhanced contact between these two parts. A cover 175 is optionally provided to keep wedge 168 free of debris.

FIGS. 15A to 15D illustrate another embodiment of connection system 10 with a bendable hosel 190. Hosel 190 is designed to bend preferable at section 192, where the outer diameter of hosel 190 has a substantial change. Hosel 190 can be bent about section 192 to change the loft and/or lie angle of the golf club. Any bendable hosel with predetermined bends or any hosel with a weakened section can be used. Hosel 190 can be bent by automatic/motored or hydraulic bending tools, commonly used in golf pro shops, e.g., Steelclub Angle Machine sold by Mitchell Golf Equipment Co., and those used to bend pipes in the plumbing art. Suitable bendable hosels are disclosed in commonly owned, co-pending U.S. patent application Ser. No. 11/621,754, filed on Jan. 10, 2007, which is incorporated herein by reference in its entirety. Hosel 190 should be bendable only by equipment made for bending hosels, and not by impact with golf balls.

Similar to the embodiment in FIGS. 14A-14F, this connection system also has an anti-rotation device comprising a first serrated surface 194 on the hosel and a corresponding second serrated surface 196 on hollow club head insert 198. To assemble the golf club, shaft insert 200 with internal threads in first inserted into shaft 14, and then bendable hosel 190 is attached to the outside of shaft 14, as shown in FIGS. 15C-15D. The shaft and hosel assembly is then inserted into club head 202. A screw 204 is inserted into heel opening 206 of club head 202 and is threaded into shaft insert 200 to retain shaft 14 to club head 202, similar to the retaining mechanism shown in FIGS. 1-4 and described above.

FIGS. 16A-16E illustrate a system for retaining screw 204 within club head 202 during the changing of hosel or club head. The connection system shown in FIG. 16A is similar to that shown in FIG. 15D, except for hollow screw cap 208. After screw 204 is inserted into heel opening 206, as discussed in the preceding paragraph, screw cap is inserted into heel opening 206 and is sized and dimensioned to be positioned at a predetermined distance, l, below the top of screw 204, as best shown in FIG. 16B. Distance l is preferably greater than the depth of the teeth of serrated surfaces 194 and 196. When a user wishes to change the hosel or club head, the user would insert a screwdriver to similar tool into heel opening 206, through hollow screw cap 208 to the top of screw 204. The user would then unscrew screw 204 to move screw 204 a distance l, or until the top of screw 204 comes into contact with screw cap 208. At this point, the user can pull shaft 14 upward to disengage first serrated surface 194 of hosel 190 from the corresponding second serrated surface 196 of club head insert 198. The user then can freely rotate shaft 14 relative to club head 202 to separate shaft 14 from club head 202. The advantage of using screw cap 208 is that screw 204 is kept within the club head and the chance of misplacing screw 204 is minimized.

Screw cap 208, as shown in FIG. 16C, may have waist 210, and heel opening 206 may have at least one ledge 212, as shown in FIG. 16D, adapted to be received within waist 210 to keep screw cap 208 securely within the club head. Alternatively, as shown in FIG. 16E may have one or more protrusions 214, as shown in FIG. 16E, to provide an interference fit between screw cap 208 and the walls of heel opening 206.

Figure 17B:
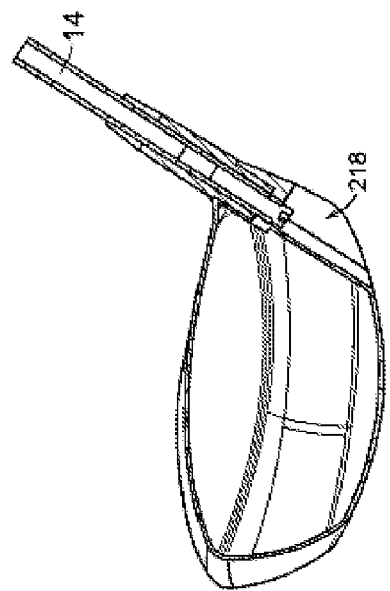
FIG. 17B is a partial cross-sectional view of the assembled golf club with a translucent window.
Figure 17A:
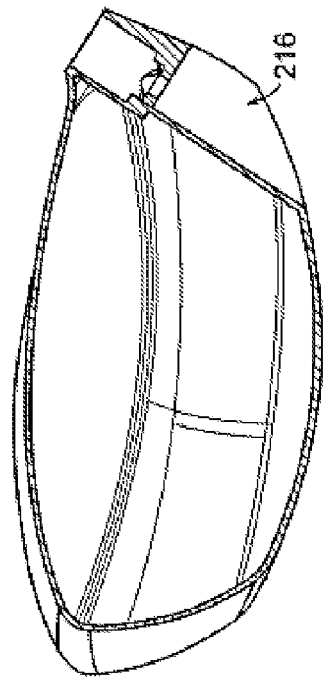
FIG. 17A is a partial cross-sectional view of a club head for use with another embodiment of the inventive connection system.

In another embodiment, the club head may have an opening 216 formed on its heel as shown in FIG. 17A. Opening 216 is adapted to receive a high impact transparent or translucent cap 218, which allows the user to view the mechanisms of connection system 10, as best shown in FIG. 17B. Suitable materials include, but are not limited to, polymethacrylate, cellulose acetate butyrate, polycarbonate (Lexan®), and glycol modified polyethylene teraphthalate, discussed above.

Figure 18B:
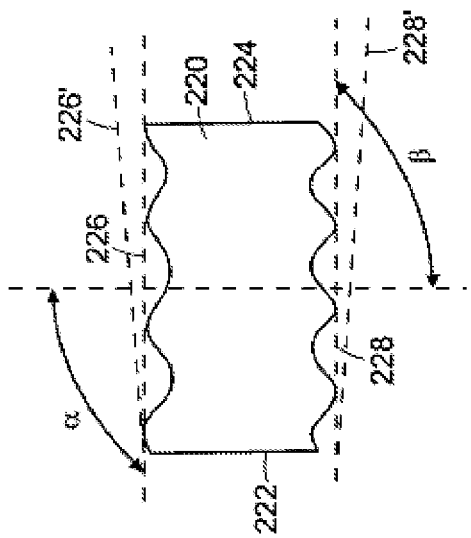
FIG. 18B is an enlarged view perspective view of the hosel insert.
Figure 18A:
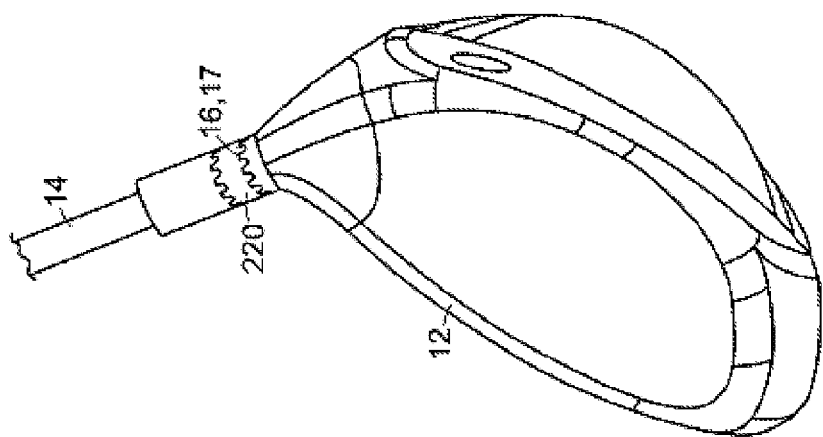
FIG. 18A is a perspective view of a club head of FIG. 5 with an hosel insert.

Another way to change the lie and/or loft angle of the golf club is illustrated in FIGS. 18A and 18B. Here, golf club 10 which includes club head 12, shaft 14 and hosel parts 16 and 17, shown above in FIG. 5, has hosel insert 220 disposed between hosel parts 16 and 17. Hosel insert 220 have serrated surfaces on its top and bottom to match the serrated surfaces of hosel parts 16 and 17, so that hosel insert 220 would fit flush in between. To change the loft/lie angle of club 10, first side 222 and second side 224 of hosel insert 220 are different from each other, or top line 226 is not parallel to bottom line 228, as illustrated by lines 226' and 228'. In other words, hosel insert 220 is askew. In one example, if first side 222 is shorter than second side 224, then angle α>angle β and α=91° and β=90°, then the shaft angle has been shifted by 1°. If the shaft coincides with the vertical axis then the shaft would have been shifted toward first side 222 by an amount equal to

|90°−β|+|90°−α|

In this example, if first side 222 and second side 224 are oriented in the toe-heel direction, then hosel insert 220 can change the lie angle. If first side 222 and second side 224 are oriented in the front-rear direction, then hosel insert 220 can change the loft angle. It is noted that hosel insert 220 does not need to have the serrated top and bottom surfaces as shown, so long as these surfaces match the corresponding surfaces on hosel parts 16 and 17. For example, if the corresponding surfaces of hosel parts 16 and 17 are linear or curvilinear, then the top and bottom surfaces of hosel insert 220 can assume the same shape. Furthermore, hosel insert 220 can be positioned above club head 12, as shown; however, it can also be located inside the club head.

Figure 20A:
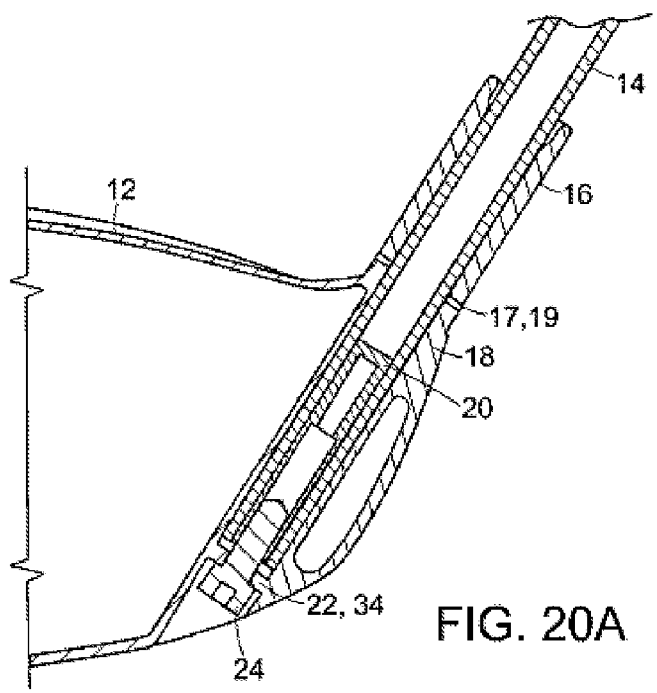
FIG. 20A is a cross-sectional view of another embodiment of the present invention.
Figure 20C:
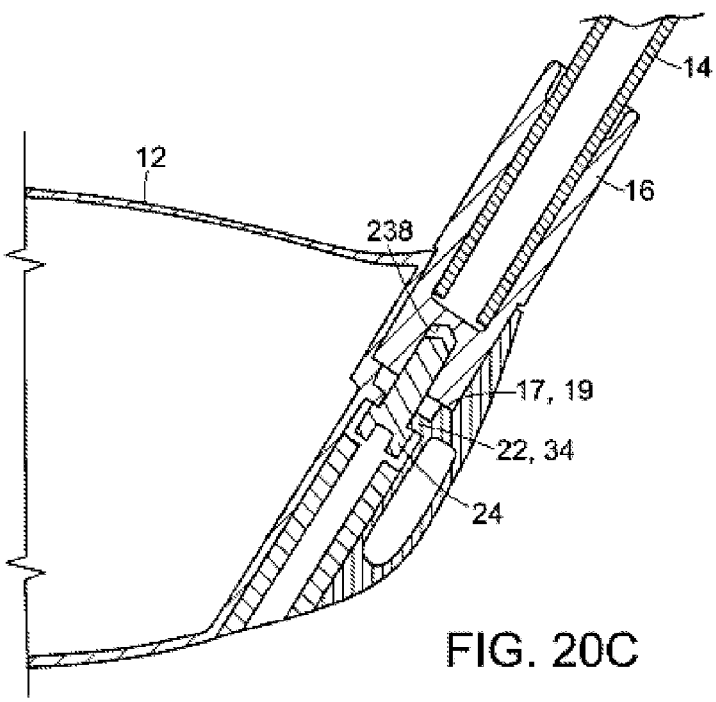
FIGS. 20B-C are cross-sectional views of variations of the embodiment shown in FIG. 20A.
Figure 20B:
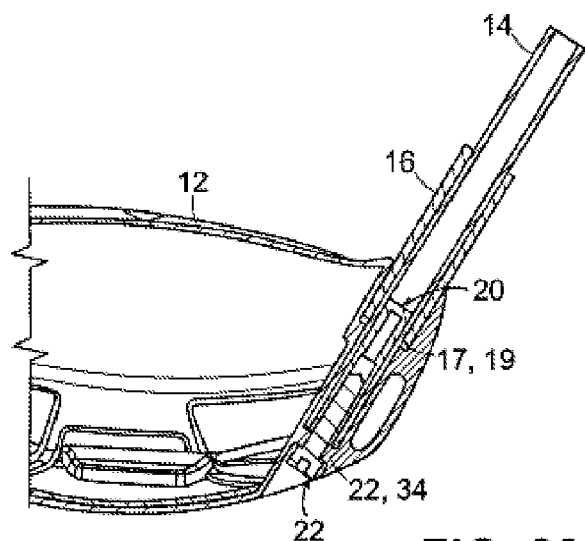

Furthermore, one of the hosel parts, can be made integral with club head 12, as illustrated in FIG. 20A. The hosel parts are preferably made from low density aluminum so that more mass can be distributed elsewhere to improve inertia and center of gravity properties. FIG. 20A is similar to FIGS. 1-5 and is illustrated with similar reference numbers. As shown, hosel part 18 is made integral to club head 12 and matching serrated surfaces 17 and 19 are positioned above club head 12, similar to the view shown in FIG. 5. Furthermore, hosel insert 220, shown in FIGS. 18A-B, can be used with this embodiment to change the lie and loft angle without bending the hosel. Alternatively, as shown in FIG. 20B, matching serrated surface 17 and 19 are positioned internal to club head 12. In this embodiment, serrated surface 19 may be formed directed on club head 12 during the casting process, and hosel part 18 can be omitted. Also, threaded shaft insert 20 can be omitted, when hosel insert 16 has threaded internal surface 238, sized and dimensioned to receive screw 24 to attach hosel 14 to club head 12, as shown in FIG. 20C. An advantage of this embodiment, is that it has fewer parts than the embodiments shown in FIGS. 20A and 20B and that instead of the smaller contact surface between shaft insert 20 and hosel 14, a larger contact surface between hosel 14 and hosel 16 is available to be epoxied together to withstand the impact force between club and golf balls.

Figure 20D:
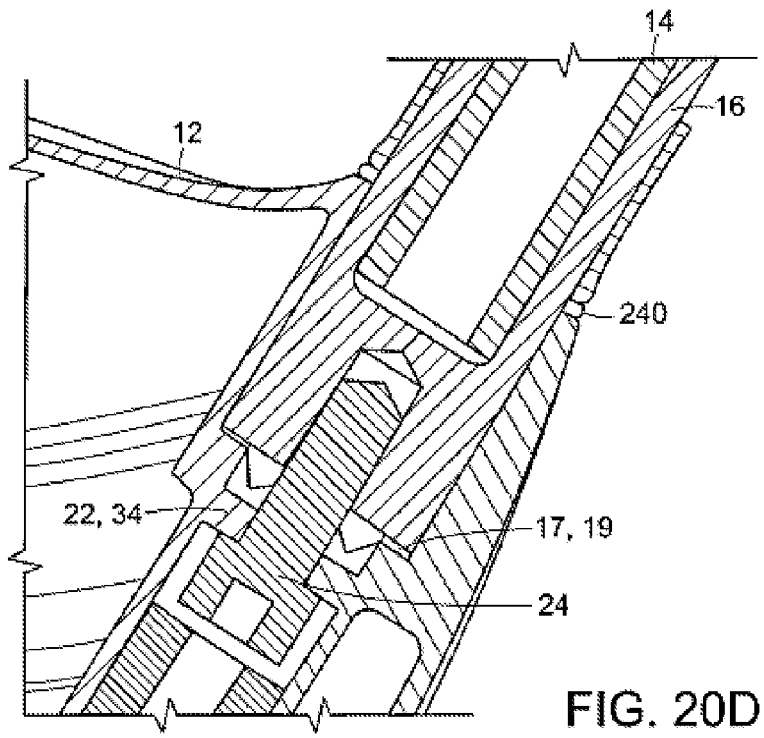
FIG. 20D is a cross-sectional view of a damper/spring usable with the present invention.

To minimize the possibility of vibration caused by ball-club impacts, a damper or a pre-load spring can be added, for example between the shaft and the club head or portion thereof as shown in FIG. 20D. FIG. 20D is an enlarged portion FIG. 20C, showing damper/spring 240. It is noted that damper/spring 240 can be used with any of the embodiments discussed and claimed herein. Part 240 can be an elastomeric or viscoelastic member designed to absorb vibration caused by impacts, and can be compressed between the hosel and the club head, as shown. Alternatively, part 240 can be one or more spring washers being compressed between the hosel and the club head to absorb the vibration. Suitable spring washers include, but are not limited to, Belleville or cupped spring washers, star spring washers, wave spring washers, curve spring washers, and locking washers.

Also, any of the threaded connections described herein, can be reinforced by a threaded helical coil, commercially available as Helicoil™ from many sources, including Emhart Teknologies. These coils are precision formed screw thread coils made from stainless steel, titanium or other durable metals, that have a diamond shaped cross-section. These coils are inserted into threaded holes, and are adapted to receive threaded fasteners. These coils are designed to be placed snugly between the threaded fasteners and threaded holes, and are designed to spread the load evenly among the threads. Typically, these coils are harder than the holes and the fasteners to minimize the possibility of thread tripping.

Typically, shafts 14 are long and slender and their geometry affects the number of teeth that can be present on serrated surfaces 17 and 19, as shown generally in FIGS. 1-2, as well as the geometry of these teeth. The size of the teeth also needs to be sufficiently robust to withstand the stresses and torque applied to the shaft. The cutting tools have their own limitation as to how small they can cut the serrated teeth. The inventors of the present invention have discovered that in one preferred embodiment three teeth on each hosel insert 16, 18 can sufficiently perform the anti-rotation function, as shown in FIGS. 19A-C. As shown, hosel part 16 has three thick tapered teeth 230 and hosel part 18 has three corresponding thin tapered teeth 232. Alternatively, thick tapered teeth 230 can be associated with hosel part 18 and vice versa. The slopes of tapered teeth 230 and tapered teeth 232 are substantially the same and are from about 20° to about 40°, preferably from about 25° to about 35°, and more preferably about 30°. Such angle extends the wear of the teeth and allows debris and dirt to escape. Teeth 232 can be from about 0.07 inch to 0.25 inch in height, preferably between about 0.09 inch to about 0.20 inch in height, and more preferably between about 0.10 inch to about 0.15 inch in height.

In accordance with another aspect of the present invention, the tapered teeth (or prongs) on serrated surfaces 17 and 19, such as teeth 230 and 232, do not come into contact with the opposing hosel part, so that the tapered teeth or prongs don't bottom out or come into contact with the opposing hosel part. In other words, a gap 236 shown in FIG. 19A is present when hosel parts 16 and 18 are assembled. This provides a manufacturing tolerance so that hosel parts 16 and 18 can fit flush together. For example, if no gap 236 is allowed and one of the teeth is slightly longer than the rest, then when assembled this longer tooth prevents the two hosel parts from coming flush together. FIG. 19D illustrates another example of gap 236 with tapered teeth 230 and 232 having substantially the same size.

Figure 21A:
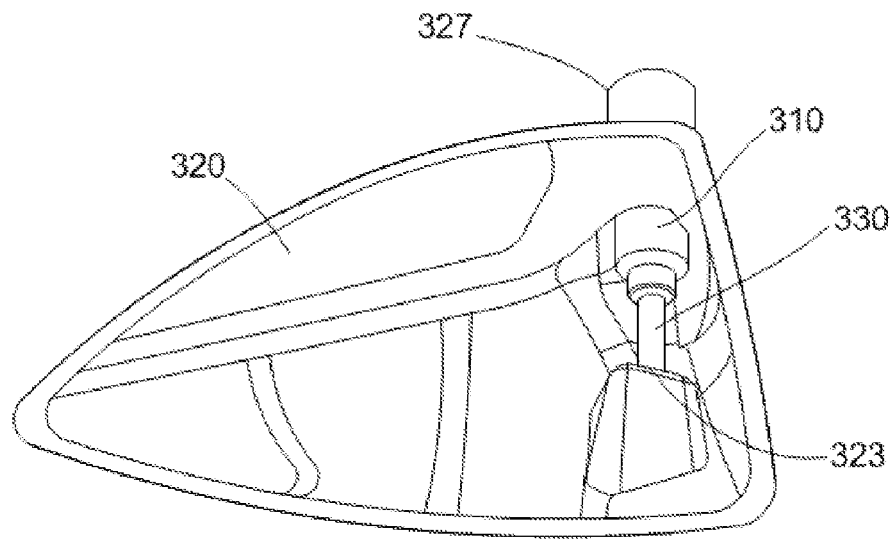
FIG. 21A is an interior schematic view showing alignment of the fastener and the shaft secured in the hosel.
Figure 21B:
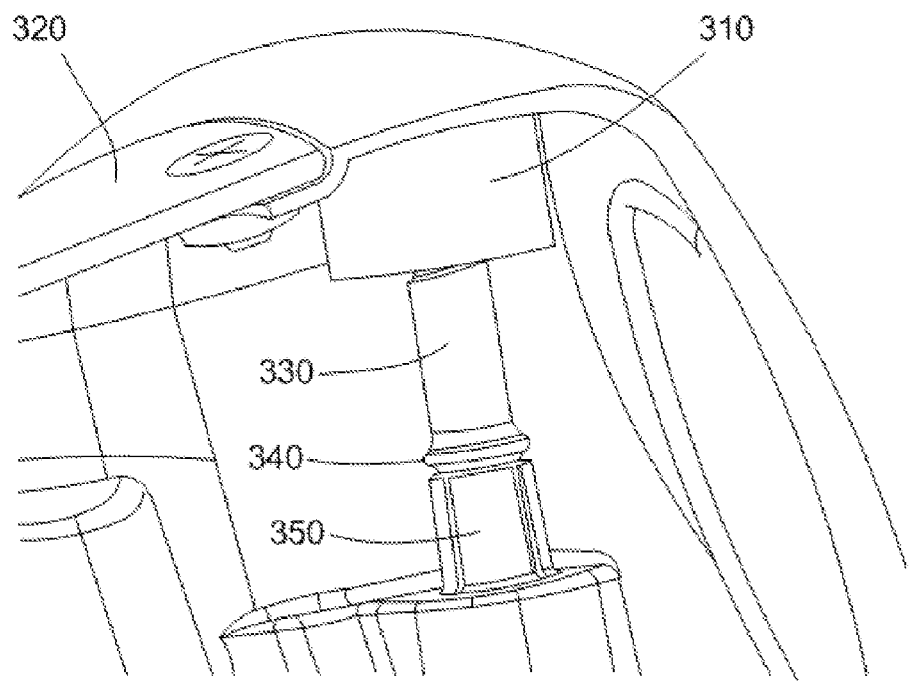
FIG. 21B shows a close-up detail of the fastener with a retaining shoulder being held in position with a retaining member that is a sleeve having slots.

Alternative joining systems may be used to reversibly attach and detach club heads from shafts. These systems can be used for club sets having interchangeable heads as well as clubs having adjustable loft and/or lie angles. In some embodiments, such as shown in FIGS. 21A and 21B, a shaft 310 will interface with a club head 320 using a fastener 330 designed to be received by the end of the shaft 310. In some embodiments, the club head 320 will comprise a heel opening 323 that allows the fastener 330 to pass through, however a head 360 of the fastener (see FIG. 22) cannot pass through the heel opening. As such, the fastener 330 exerts a force between the club head 320 and the shaft 310 as the fastener 330 is tightened, e.g., with rotation. While not shown in detail in FIGS. 21A and 21B, it is understood that rotation of the shaft 310 may be limited by the hosel 327, which may include a serrated surface, e.g., as described above. The design allows the shaft 310 to be loosened, the shaft 310 rotated with respect to the club head 320, and then the fastener 330 retightened in order to change the trajectory profile of the club head 320 with respect to the shaft 310. While not shown in FIG. 21A, the hosel 327 may have an opening, e.g., a window, that is designed to indicate a loft or lie angle corresponding to the position of the shaft 310.

While FIGS. 21A and 21B clearly show the fastener 330 mating with the shaft 310, a user of the club will, in fact need to mate the fastener 330 with the shaft blindly. That is, the user will have to align the fastener 330 axially with the shaft so that the fastener can mate with the appropriate structure in the shaft 310, e.g., a threaded hole, in order to secure the shaft 310 without damaging the fastening mechanism, e.g., cross-threading a screw. Optimally, the fastener 330 will also be held in an elevated position even when the club is normally-oriented (i.e., the fastener 330 is upside down), thereby making it easier to mate the shaft 310, e.g., by initially hand-threading the shaft 310 onto the fastener 330.

These goals are met with the design shown in FIG. 21B whereby a fastener 330 having a retaining shoulder 340 is held in place by a retaining structure 350. With the design shown in FIG. 21B, the fastener 330 cannot move down away from the heel opening 323 nor can it move substantially from the axis of the shaft 310. The fastener 330 can rotate freely, however, making it easier to engage the shaft 310. Additionally, because the retaining structure 350 does not interact with the fastener 330 except to hold it in place, the retaining structure 350 will not be damaged with repeated attachment of the club head 320 to the shaft 310. That is, if the retaining structure 350 interacted with a threaded portion of fastener 330, it is possible that the retaining structure could be stripped or pulled away from the heel opening 323 with repeated engagement of the fastener 330.

When used to attach a golf club head to a golf club shaft, the inventive design in FIG. 21B benefits the golfer by making the club head lighter and easier to manufacture, thus reducing costs. Prior art designs used align a fastener similar to fastener 330 have required intricate extensions to be cast or stamped into the head 320 to maintain the fastener alignment. Such extensions make the head more difficult to manufacture, and result in added weight.

Using the design of FIG. 21B, for example, the heel opening 323 can be closer to the bottom of the head, reducing the complexity of placing the heel opening 323. Additionally, the material surrounding the heel opening 323 can be fabricated from thinner materials, further reducing cost and weight. Furthermore, the weight that is required to secure the retaining structure 350 is moved lower in the head 320. In the embodiment shown in FIG. 21B, it is estimated that the use of the disclosed retaining structure 350 saves between 1 and 2 grams of weight.

Figure 22:
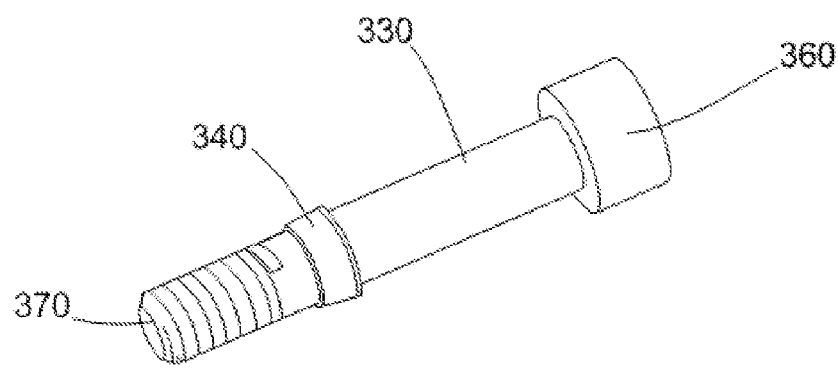
FIG. 22 shows a screw having a retaining shoulder.

An embodiment of a fastener 330 having a retaining shoulder is shown in FIG. 22. The fastener 330 also has a head 360 and a threaded portion 370. The head 360 has an engagement structure 365 (FIG. 23) configured to receive a tool, such as an Allen key or a screwdriver. The tool need not have a particular configuration, as any configuration, such as triangular, square, pentagonal, hexagonal, heptagonal, octagonal, cross, slot, or star shaped, can be used to secure fastener 330 to shaft 310. The retaining shoulder 340 is shown as a tapered ring that fits on fastener 330 and interacts with retaining structure 350 to keep fastener 330 in the desired position. The retaining shoulder 340 need not be tapered, as it can be semicircular, triangular, or rectangular in cross-section provided that it can interact with the retaining structure 350 to keep the fastener 330 in position. Alternatively, retaining shoulder 340 can be a slotted ring or a clip provided that the retaining shoulder can move through the retaining structure 350. If the retaining shoulder 340 is a separate piece that mates with the fastener 330, it may be constructed from metal or plastic. In alternative embodiments, the retaining shoulder 340 can be integral with the fastener, e.g., a bolt having a shaft with a slot cut in it toward the threaded end to interact with the retaining structure 350. While the fastener is depicted as a screw or a bolt, fastener 330 may alternatively be a hook structure, or a shaft with a structure to interact with a slot, similar to the structure described in FIGS. 8 and 9. Fastener 330 may be fabricated from metal, such as steel, aluminum, or titanium, or from a resilient plastic or lightweight composite.

Figure 23:
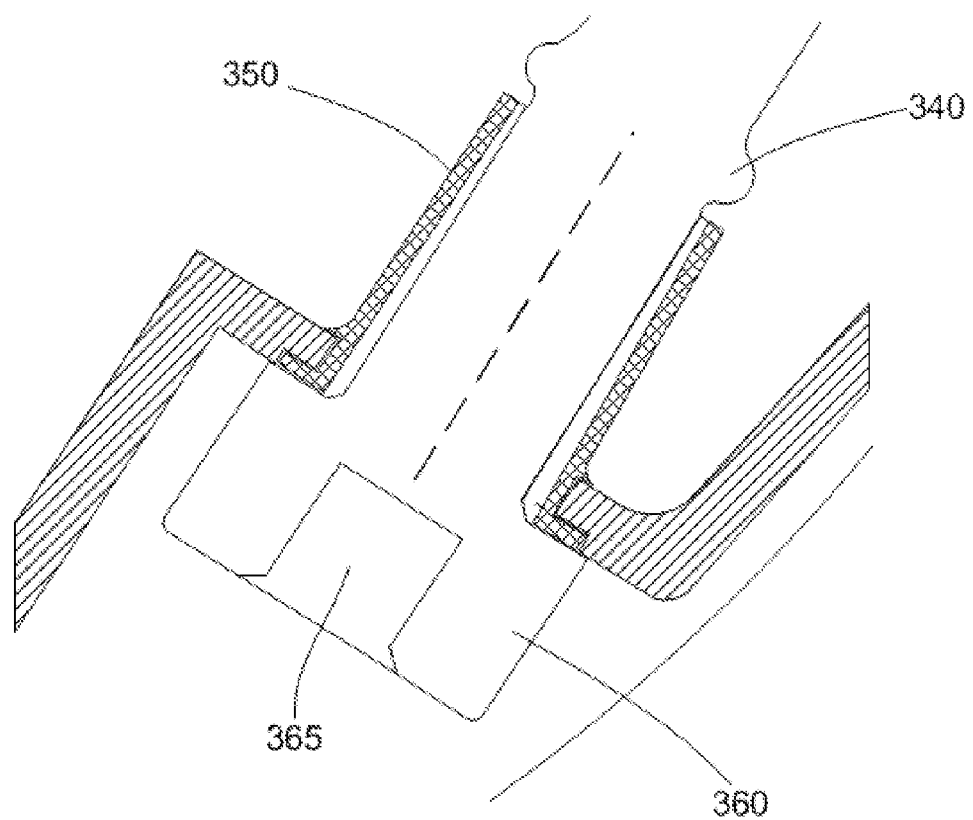
FIG. 23 illustrates the principle whereby motion of a fastener having a retaining shoulder is restricted by a structure incorporated into a club head. The structure may be integrated into the club head, or it may be a separate retaining member such as shown in FIG. 24A,B and FIG. 25A,B.

FIG. 23 shows a cross-section detailing the interaction between retaining structure 350 and fastener 330. Retaining structure 350 is typically a thin structure protruding from the interior surface of the club head in an upward direction toward the shaft 310, as shown in FIG. 21B. The protrusions of retaining structure 350 must be sufficiently resilient to accept the retaining shoulder 340 of the fastener 330 and then return to a position to restrain the fastener 330 via the retaining shoulder 340 as shown in FIG. 23. In some embodiments, as shown in FIG. 23, the head 360 of fastener 330 will provide pressure against the club head directly. In other embodiments, the head may provide pressure against a washer or another intermediate structure which provides pressure against the head 320.

The retaining structure 350 may be integrated into the club head, or an independent retaining member may be used to secure the fastener 330 in the correct position. In embodiments wherein the retaining structure 350 is integrated into the club head, the retaining structure 350 will typically be constructed from the material of the club head, e.g., aluminum, titanium, or composite. In other embodiments, a retaining member, such as depicted in FIGS. 24A,B and 25A,B, is the retaining structure 350 that holds fastener 330 in the desired position.

Figure 24A:
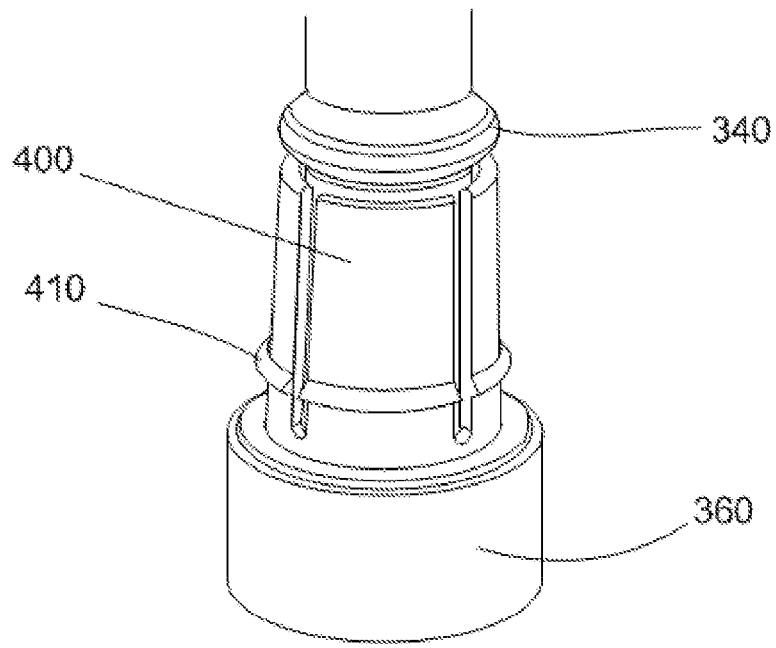
FIG. 24A is a perspective view of an embodiment of a retaining member interfaced with a fastener having a retaining shoulder.
Figure 24B:
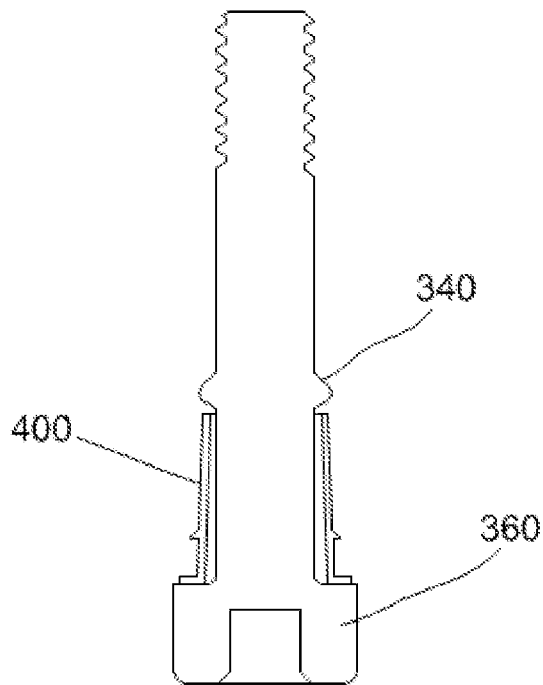
FIG. 24B is a cross-sectional view of a fastener having a retaining shoulder, held in place by the retaining member of FIG. 24A.

As shown in FIG. 24A, a retaining member may comprise a sleeve 400 of lightweight material, having slots to allow the protrusions to expand to receive the retaining shoulder 340 and then return to a shape to hold the retaining shoulder 340 in place. Once fastener 330 is secured in sleeve 400, the sleeve and fastener 330 can be inserted into the heel opening 323 in the heel of the club. The annular protrusions 410 on the sleeve 400 will cause the sleeve 400 to be secure in the heel opening 323, thereby keeping fastener 330 at the correct height and axially-aligned with the shaft 310. The sleeve 400 additionally assures that fastener 330 does not fall from the club head when not engaged with the shaft 310. The sleeve 400 can be made from any suitable lightweight and resilient material such as plastic, composite, or metal. In preferred embodiments, the sleeve 400 is constructed from injection molded plastic. A cross section of the fastener 330 mated with the sleeve 400 is shown in FIG. 24B.

Figure 25A:
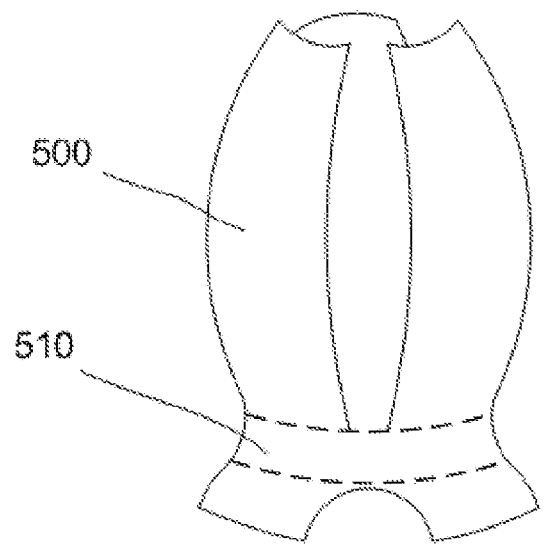
FIG. 25A is a perspective view of an embodiment of a retaining member in a relaxed position prior to interfacing with a fastener or a club head.
Figure 25B:
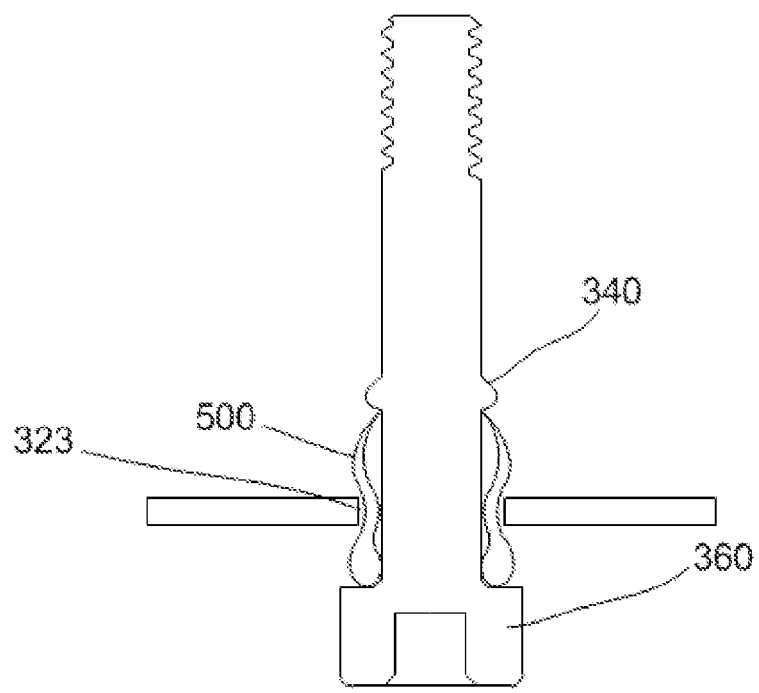
FIG. 25B is a cross-sectional view of a fastener having a retaining shoulder, held in place by the retaining member of FIG. 25A.

Other retaining member structures can be used to retain fastener 330 with club head 320, as shown in FIGS. 25A and 25B. FIG. 25A shows a clip 500 suitable to retain fastener 330 via retaining shoulders 340. In FIG. 25A, the clip 500 is shown in a relaxed state, i.e., not interfaced with a fastener 330. The clip 500 has a plurality of protrusions that allow the clip to expand to receive the retaining shoulder 340 of fastener 330 and then return to a position suitable to restrict motion of retaining shoulder 340 (See FIG. 25B). Like the sleeve 400 shown in FIGS. 24A and 24B, the clip 500 is inserted into the heel opening 323 once assembled. A waist 510 causes the clip 500 to be retained, as shown in FIG. 25B. Other suitable clips 500 may be designed to meet the same needs with similar structures. The clip 500 can be made from any suitable lightweight and resilient material such as plastic, composite, or metal. In preferred embodiments, the clip 500 is constructed from injection molded plastic. A cross section of the fastener 330 mated with the clip 500 is shown in FIG. 25B.

The embodiments of the present invention are illustrated with driver-type or iron-type clubs. However, it is understood that any type of golf club, e.g., hybrid, wedge, or putter, can use one or more of the connection systems 10 disclosed. Additionally, connection system 10 can be used with non-golf equipment, such as fishing poles, tennis rackets, squash rackets, racquetball rackets, lacrosse sticks, aiming sights for firearms, hammers, axes, plumbing, etc.

While it is apparent that the illustrative embodiments of the invention disclosed herein fulfill the objectives stated above, it is appreciated that numerous modifications and other embodiments may be devised by those skilled in the art. Elements from one embodiment can be incorporated into other embodiments. Therefore, it will be understood that the appended claims are intended to cover all such modifications and embodiments, which would come within the spirit and scope of the present invention.

INCORPORATION BY REFERENCE

References and citations to other documents, such as patents, patent applications, patent publications, journals, books, papers, and web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A system for reversibly joining a club shaft to a club head, comprising:
   a fastener comprising a proximal end defining a head, a distal end defining a threaded portion, and a retaining shoulder positioned along a length of the fastener between and separate from the head and the threaded portion;
   a club head comprising a first opening, a second opening, and a retaining member positioned within an interior of the club head and axially aligned with the first opening, wherein the first opening and the retaining member are each configured to receive at least the distal end and the retaining shoulder of the fastener entirely therethrough, wherein the retaining member is configured to span a length of the fastener between the head and the retaining shoulder and to be in contact with the retaining shoulder to prevent movement of the fastener in a direction towards the first opening, wherein the retaining member is configured to retain the fastener within the interior of the club head and in axial alignment with the second opening of the club head; and
   a club shaft configured to be received through the second opening of the club head and reversibly receive at least the distal end of the fastener, thereby joining the shaft and the club head.

2. The system of claim 1, wherein the retaining member retains the fastener substantially centered in a socket that receives an end of the club shaft.

3. The system of claim 1, wherein the retaining member is constructed from a resilient material that allows the fastener shoulder to pass through the retaining member but prevents the head of the fastener to pass therethrough.

4. The system of claim 3, wherein the retaining member is a sleeve having slots spanning a portion of the retaining member.

5. The system of claim 4, wherein the sleeve is constructed from plastic or metal.

6. The system of claim 5, wherein the sleeve comprises protrusions that retain the sleeve in a hole in the club head.

7. The system of claim 3, wherein the retaining member is a clip having first protrusions that retain the retaining shoulder and second protrusions that retain the clip in a hole in the club head.

8. The system of claim 7, wherein the clip is constructed from plastic or metal.

9. The system of claim 1, wherein the fastener is a screw or bolt.

10. The system of claim 9, wherein the head of the screw or bolt is configured to receive a tool.

11. The system of claim 10, wherein the tool has a triangular, square, pentagonal, hexagonal, heptagonal, octagonal, cross, slot, or star shape.

12. The system of claim 9, wherein an end of the shaft comprises a threaded hole for receiving the screw or bolt.

13. The system of claim 1, wherein the retaining shoulder is tapered.

14. The system of claim 1, wherein the club head is a golf club head and the club shaft is a golf club shaft.

15. The system of claim 14, wherein the golf club head comprises a hosel and an end of the golf club shaft fits inside the hosel.

16. The system of claim 14, wherein the golf club head is a driver-type golf club head, a hybrid-type golf club head, an iron-type golf club head, or a putter.

17. The system of claim 14, wherein the golf club shaft is constructed from wood, metal, or a composite.

18. The golf club head of claim 1, wherein the retaining member comprises:
   a proximal end positioned adjacent to the first opening and configured to be in direct contact with the head of the fastener; and
   a distal end positioned within the interior of the club head and adjacent to the distal end of the fastener and configured to be in contact with the retaining shoulder of the fastener.

19. The golf club head of claim 1, wherein the retaining member spans the entire length of the fastener between the head and the retaining shoulder.

* * * * *